United States Patent
Isobe et al.

(10) Patent No.: US 10,636,202 B2
(45) Date of Patent: Apr. 28, 2020

(54) INFORMATION PROCESSING APPARATUS FOR INTERRUPTING THREE-DIMENSIONAL MODELING, THREE-DIMENSIONAL MODELING SYSTEM, AND COMPUTER READABLE MEDIUM STORING INFORMATION PROCESSING PROGRAM FOR THE SAME

(71) Applicant: FUJI XEROX CO., LTD., Tokyo (JP)

(72) Inventors: Kimihiko Isobe, Kanagawa (JP); Mamoru Mochizuki, Kanagawa (JP); Kenichirou Hotokeishi, Kanagawa (JP); Takashi Kikumoto, Kanagawa (JP); Jun Wakamatsu, Kanagawa (JP); Masaharu Tonouchi, Kanagawa (JP); Kazuhiro Ohkawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 189 days.

(21) Appl. No.: 15/726,773

(22) Filed: Oct. 6, 2017

(65) Prior Publication Data
US 2018/0204374 A1    Jul. 19, 2018

(30) Foreign Application Priority Data
Jan. 18, 2017  (JP) .................. 2017-007076

(51) Int. Cl.
*G06T 17/00* (2006.01)
*B29C 64/147* (2017.01)
(Continued)

(52) U.S. Cl.
CPC ............ *G06T 17/00* (2013.01); *B29C 64/147* (2017.08); *B33Y 50/02* (2014.12); *G03G 15/224* (2013.01)

(58) Field of Classification Search
CPC .... B29C 64/147; B33Y 50/02; G03G 15/224; G06T 17/00
See application file for complete search history.

(56) References Cited

U.S. PATENT DOCUMENTS

| 5,774,356 A * | 6/1998 | Hisatake .......... G06F 3/1296 101/113 |
| 6,506,477 B1 | 1/2003 | Ueda et al. |

(Continued)

FOREIGN PATENT DOCUMENTS

| JP | 2000-043149 | 2/2000 |
| JP | 2000-177016 | 6/2000 |

OTHER PUBLICATIONS

Abstract and machine translation of JP 2000-43149.

*Primary Examiner* — Yuhui R Pan
(74) *Attorney, Agent, or Firm* — Fildes & Outland, P.C.

(57) ABSTRACT

An information processing apparatus includes: an interrupting unit that, in case where image formation based on 2D image data is commanded during execution of 3D modeling based on slice data generated by slicing 3D data, suspends output of image formation data for formation of slice images on respective recording media by an image forming apparatus and output of control data that allow a post-processing apparatus to perform, without delay, post-processing of the 3D modeling on the recording media on which slice images have been formed by the image forming apparatus; a changing unit that changes order of execution of formation of remaining slice images of the 3D modeling, a remaining part of the post-processing of the 3D modeling, and image formation based on the 2D image data, according to a prescribed condition; and an output unit as defined herein.

8 Claims, 18 Drawing Sheets

(51) Int. Cl.
*B33Y 50/02* (2015.01)
*G03G 15/22* (2006.01)

(56) References Cited

U.S. PATENT DOCUMENTS

2005/0270573 A1* 12/2005 Ferlitsch ............ G03G 15/5012
　　　　　　　　　　　　　　　　　　　　358/1.15
2016/0009069 A1* 1/2016 Mou ................... B32B 38/145
　　　　　　　　　　　　　　　　　　　　216/52

* cited by examiner

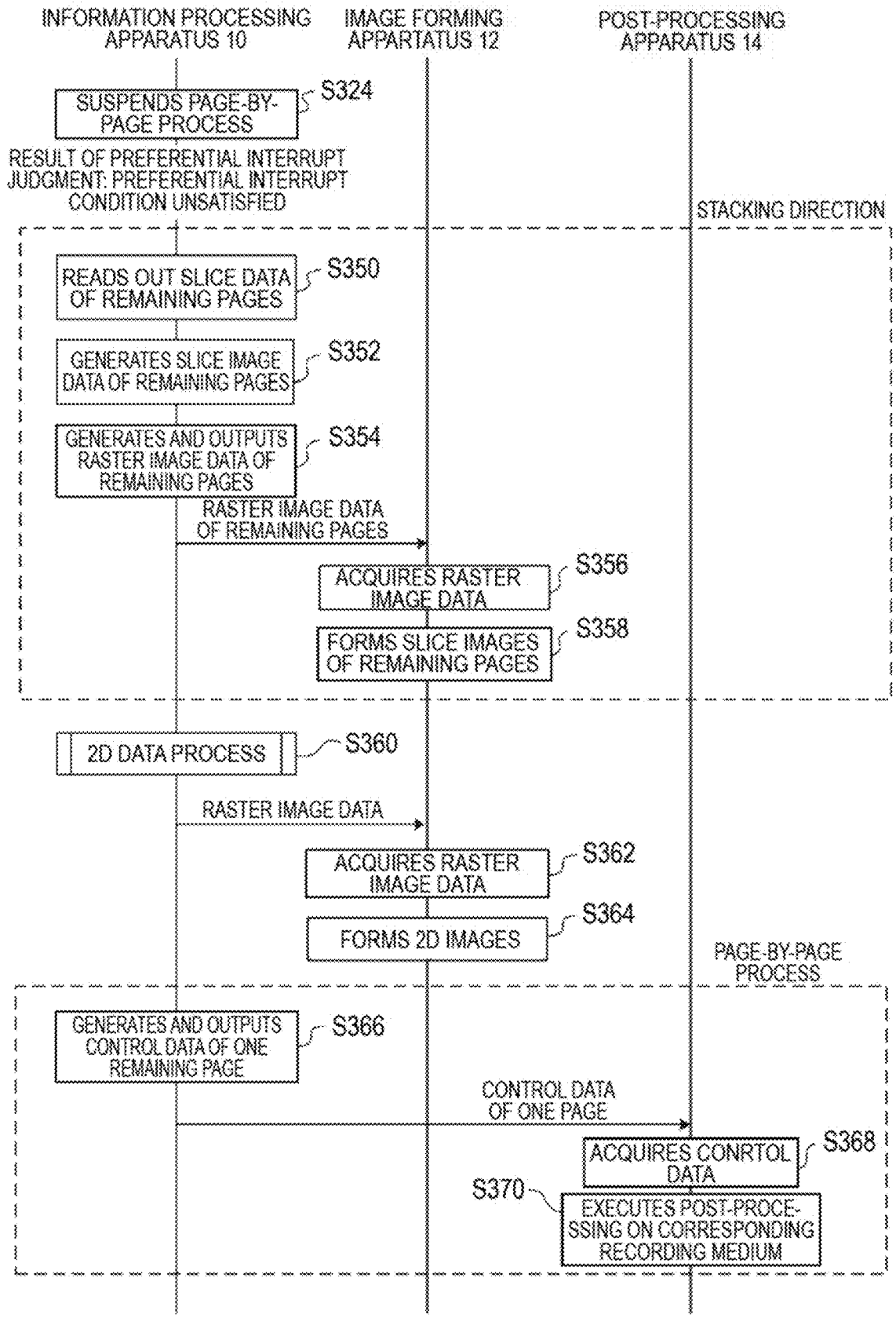

INFORMATION PROCESSING APPARATUS FOR INTERRUPTING THREE-DIMENSIONAL MODELING, THREE-DIMENSIONAL MODELING SYSTEM, AND COMPUTER READABLE MEDIUM STORING INFORMATION PROCESSING PROGRAM FOR THE SAME

CROSS-REFERENCE TO RELATED APPLICATIONS

This application is based on and claims priority under 35 USC 119 from Japanese Patent Application No. 2017-007076 filed on Jan. 18, 2017.

BACKGROUND

Technical Field

The present invention relates to an information processing apparatus, a three-dimensional modeling system, and a computer readable medium storing an information processing program.

SUMMARY

According to an aspect of the invention, there is provided an information processing apparatus comprising: an interrupting unit that, in case where image formation based on 2D image data is commanded during execution of 3D modeling based on slice data generated by slicing 3D data, suspends output of image formation data for formation of slice images on respective recording media by an image forming apparatus and output of control data that allow a post-processing apparatus to perform, without delay, post-processing of the 3D modeling on the recording media on which slice images have been formed by the image forming apparatus; a changing unit that changes order of execution of formation of remaining slice images of the 3D modeling, a remaining part of the post-processing of the 3D modeling, and image formation based on the 2D image data, according to a prescribed condition; and an output unit, that generates image formation data from the 2D image data and outputs the generated image formation data to the image forming apparatus, generates image formation data from slice data and outputs the generated image formation data to the image forming apparatus, and generates control data on the basis of the slice data and outputs the generated control data to the post-processing apparatus, according to the changed order.

BRIEF DESCRIPTION OF THE DRAWINGS

Exemplary embodiments of the present invention will be described in detail based on the following figures, wherein:

FIG. 17 is a sequence diagram illustrating an operation that the 3D modeling system performs after a judgment that a preferential interrupt condition is not satisfied is made in the preferential interrupt judgment process.

DESCRIPTION OF SYMBOLS

Figure 1A:
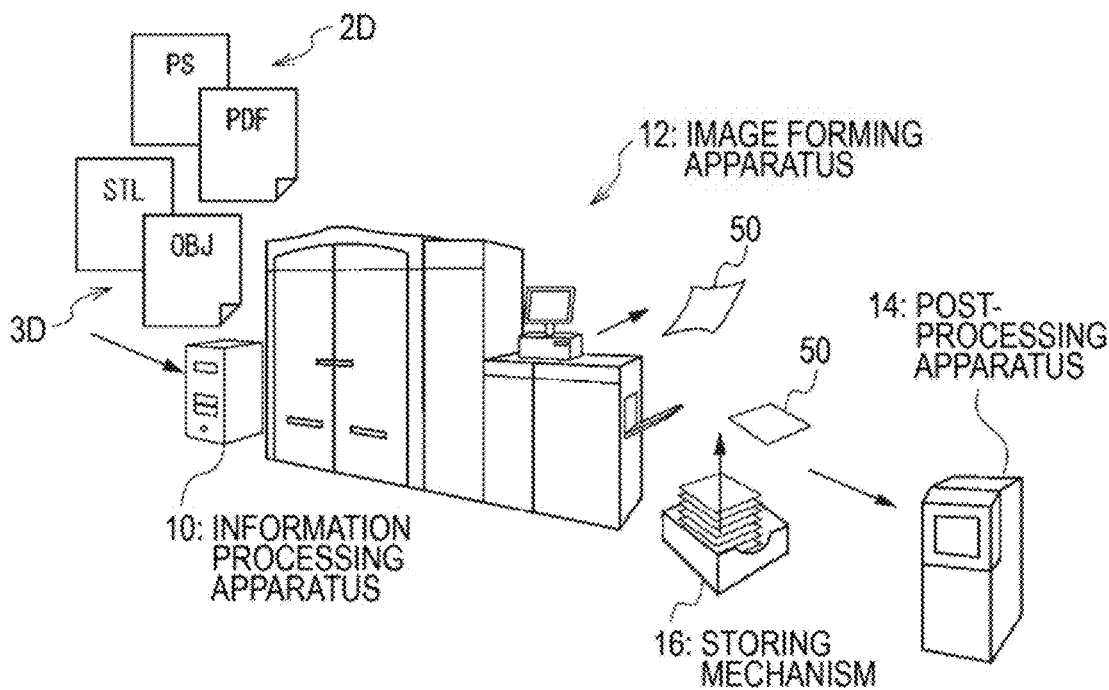
FIG. 1A is a schematic diagram illustrating the configuration of a 3D modeling system of a referential example.

10: Information processing apparatus
12: Image forming apparatus
14: 3D modeling post-processing apparatus (post-processing apparatus)
16: Storing mechanism
17: Post-processing apparatus
20: Glue applying unit
22: Cutting-out unit
24: Compression bonding unit
26: Conveyance path
30: Information processing unit
31: External apparatus
32: Operation unit
34: Display
36: Communication unit
38: Memory
40: File format, conversion unit
42: Raster processing unit
44: 3D data processing unit
45: Slice processing unit
46: Slice data memory
47: Image data generation unit 48: Control data generation unit
50: Recording medium
52: Lamination component
53: Unnecessary portion
54: Cutting line
56: Colored region
58: Glue application region
M: 3D model
Mn: Slice image
P: 3D modeled object
D: Removal target

DETAILED DESCRIPTION

A first exemplary embodiment of the present invention will be hereinafter described in detail with reference to the drawings.
<Three Dimensional Modeling System>
(Overall Configuration)

First, a three-dimensional (3D) modeling system according to the exemplary embodiment of the invention will be described. The 3D modeling system according to the exemplary embodiment manufactures a three-dimensional (3D) modeled object by a sheet lamination 3D modeling method. In the sheet lamination 3D modeling method, plural pieces of slice data are generated by slicing three-dimensional (3D) data of a 3D model by plural planes and slice images are formed on respective sheet-like recording media such as paper sheets on the basis of the plural pieces of slice data. Then 3D modeling post-processing is performed on the recording media on which the slice images are formed; for example, the plural recording media are laminated by subjecting them to certain processing.

Plural pieces of data relating to 3D data of one 3D model may be referred to as a "series of data"; for example, plural pieces of slice data as mentioned above may be referred to as a "series of slice data."

Figure 1B:
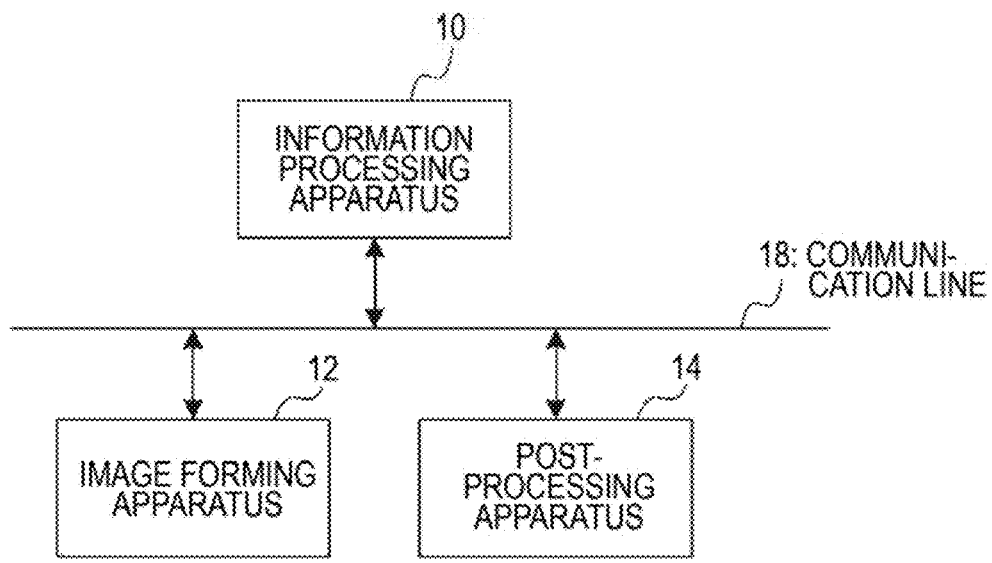
FIG. 1B is a block diagram showing an example configuration of a 3D modeling system according to a first exemplary embodiment of the present invention.
Figure 2:
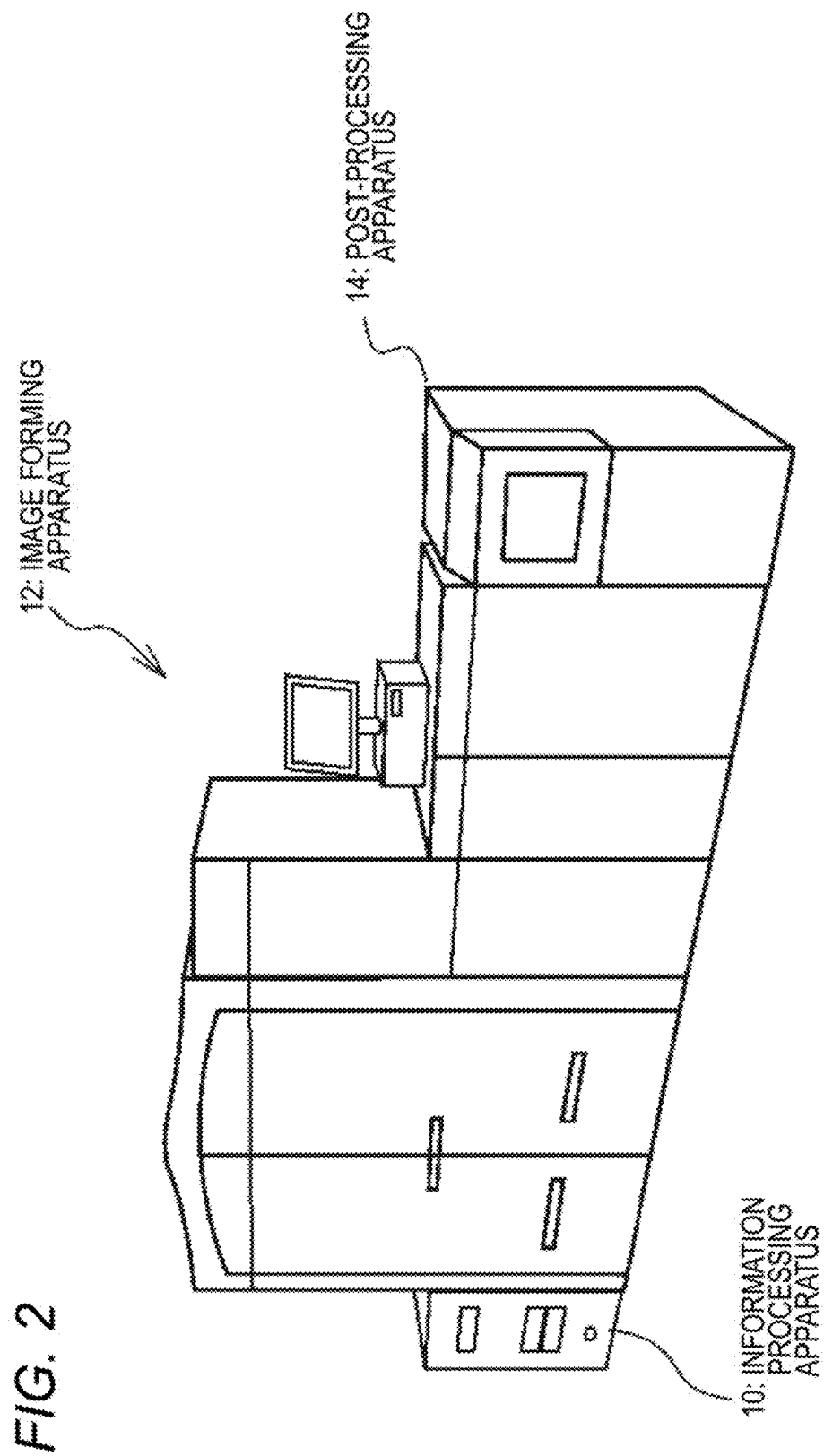
FIG. 2 is a schematic diagram showing the example configuration of the 3D modeling system according to the first exemplary embodiment.

FIG. 1B is a block diagram showing an example configuration of a 3D modeling system according to the exemplary embodiment. FIG. 2 is a schematic diagram showing the example configuration of the 3D modeling system according to the exemplary embodiment. As shown in FIGS. 1B and 2, the 3D modeling system according to the exemplary embodiment is equipped with an information processing apparatus 10, an image forming apparatus 12, and a 3D modeling post-processing apparatus 14.

The 3D modeling system according to the exemplary embodiment is an in-line system in which the 3D modeling apparatus 14 is incorporated as one of post-processing apparatus. As shown in FIG. 2, the 3D modeling apparatus 14 is disposed close to the image forming apparatus 12 and shares a recording medium conveyance path with the image forming apparatus 12. Thus, recording media 50 on which slice images have been formed by the image forming apparatus 12 are supplied to the 3D modeling post-processing apparatus 14 without delay and subjected to post-processing there.

The image forming apparatus 12 forms images on respective recording media 50 on the basis of raster image data. The raster image data are an example of the "image formation data". In the exemplary embodiment, the image forming apparatus 12 is not dedicated to 3D modeling; it functions as an ordinary image forming apparatus if instructed to work for image formation based on 2D image data. Thus, the information processing apparatus 10 performs different kinds of information processing depending on whether it is instructed to work for image formation based on 2D image data or 3D modeling based on 3D data.

The image forming apparatus 12 is an apparatus for forming an image on a recording medium by electrophotography, for example. In this case, the image forming apparatus 12 includes a photoreceptor drum, a charging device, an exposing device, a developing device, a transfer device, a fusing device, etc. The charging device charges the photoreceptor drum. The exposing device exposes the charged surface of the photoreceptor drum to light that reflects an image to be formed. The developing device develops, with toner, an electrostatic latent image formed on the photoreceptor drum by the exposure. The transfer device transfers a toner image formed on the photoreceptor drum by exposure to a recording medium. The fusing device fuses the toner image transferred to the recording medium. The image forming apparatus 12 may be an inkjet recording apparatus, in which case the image forming apparatus 12 includes an inkjet recording head for ejecting ink droplets toward a recording medium according to an image to be formed and other components.

If instructed to work for 3D modeling based on 3D data, the information processing apparatus 10 generates slice data of plural pages on the basis of the 3D data and stores the generated slice data of plural pages in a memory such as a RAM. The information processing apparatus 10 of the in-line 3D modeling system reads out the slice data of plural pages page by page. The information processing apparatus 10 generates raster image data of one page on the basis of read-out slice data of each page, and outputs the raster image data of one page to the image forming apparatus 12. If instructed to work for image formation based on 2D image data, the information processing apparatus 10 generates raster image data of 2D images from the 2D image data and outputs the generated raster image data to the image forming apparatus 12.

The information processing apparatus 10 of the in-line 3D modeling system further generates control data of one page on the basis of read-out slice data of each page. The control data are data for allowing the 3D modeling post-processing apparatus 14 to perform 3D modeling post-processing. As described later, control data include control data that specify a cutting line along which to cut out a lamination component from a recording medium and control data that specify a glue application region where glue is applied to the recording medium. Raster image data of one page and control data of one page corresponding to the same slice image are generated on the basis of the same slice data. The information processing apparatus 10 outputs the generated control data of one page to the 3D modeling post-processing apparatus 14.

As described above, in the in-line 3D modeling system, each recording medium 50 on which a slice image has been formed by the image forming apparatus 12 is supplied uninterruptedly to the 3D modeling post-processing apparatus 14. The 3D modeling post-processing apparatus 14 performs 3D modeling post-processing on the supplied recording medium 50 according to control data corresponding to the slice image formed on the recording medium 50.

Figure 18A:
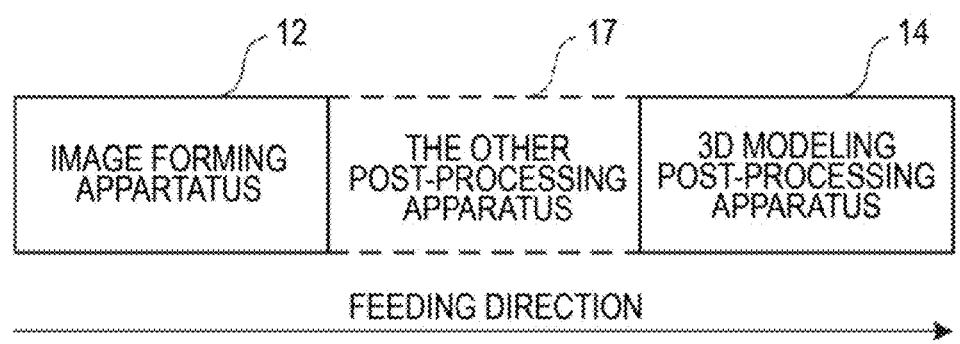
FIGS. 18A and 18B are diagrams illustrating how individual apparatus constituting an in-line 3D modeling system are arranged.
Figure 18B:
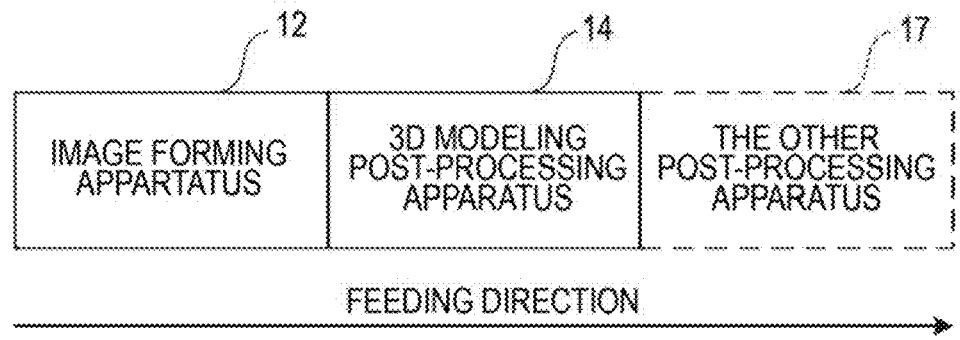

FIGS. 18A and 18B are diagrams illustrating examples of how the individual apparatus constituting the in-line 3D modeling system are arranged in a case that the in-line 3D modeling system includes a post-processing apparatus 17 in addition to the 3D modeling post-processing apparatus 14. The image forming apparatus 12, the other post-processing apparatus 17, and the 3D modeling post-processing apparatus 14 may be arranged in the feeding direction of a recording medium 50 in this order, that, is, the order shown in FIG. 18A. In the case of 3D modeling based on 3D data, each recording medium 50 on which a slice image has been formed by the image forming apparatus 12 is supplied to the 3D modeling post-processing apparatus 14 past the other post-processing apparatus 17.

Alternatively, the image forming apparatus 12, the 3D modeling post-processing apparatus 14, and the other post-processing apparatus 17 may be arranged in the feeding direction of a recording medium 50 in this order, that is, the order shown in FIG. 18B. In the case of image formation based on 2D image data, each recording medium 50 on which a 2D image has been formed by the image forming apparatus 12 is supplied to the other post-processing apparatus 17 past the 3D modeling post-processing apparatus 14. In the following description, the in-line 3D modeling system will be described with an assumption that it is not equipped with the other post-processing apparatus 17 and the 3D modeling post-processing apparatus 14 will be abbreviated as a "post-processing apparatus 14."

FIG. 1A shows, as a referential example, a configuration in which the image forming apparatus 12 and the 3D modeling post-processing apparatus 14 are spaced from each other and does not share a conveyance path of recording media 50 (offline or near-line). Since the image forming apparatus 12 and the 3D modeling post-processing apparatus 14 does not share a conveyance path, plural recording media 50 on which a series of slice images are formed are stacked in order of formation of the slice images and stored in a storing mechanism 16 such as a stacker. A bundle of stacked recording media 50 is taken out of the storing mechanism 16 and supplied to the 3D modeling post-processing apparatus 14 together.

(Sheet Lamination 3D Modeling)

Figure 3A:
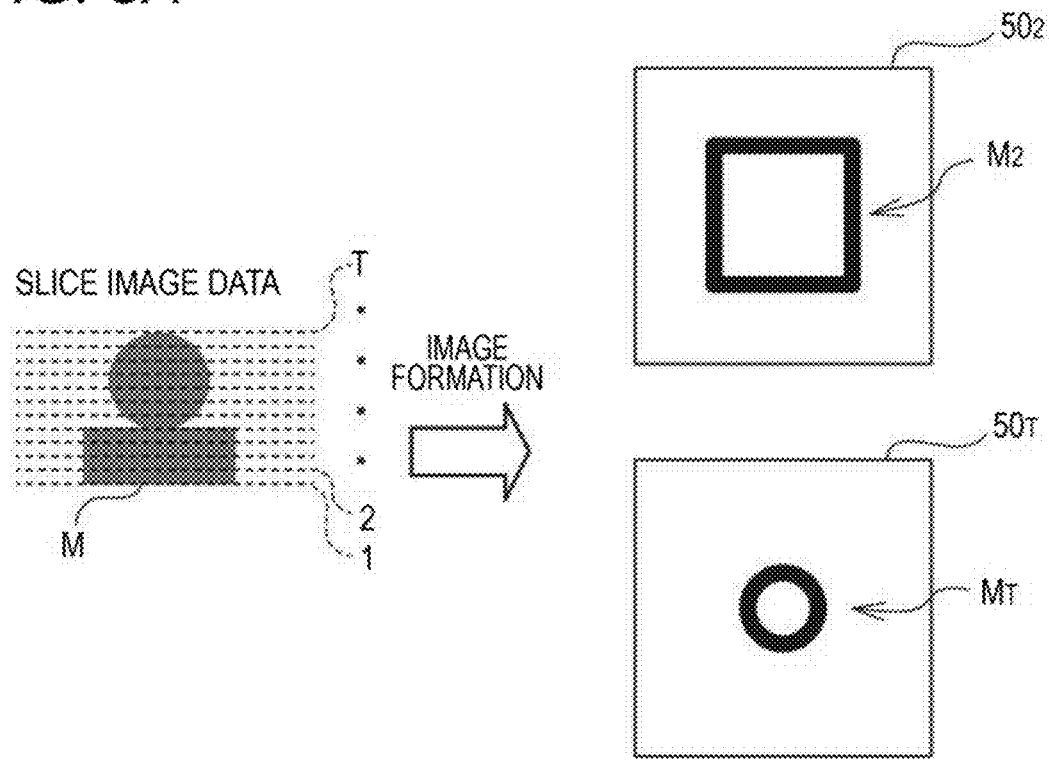
FIG. 3A is a schematic diagram illustrating slice image data used in sheet lamination 3D modeling.

Next, individual processes of sheet lamination 3D modeling will be described. FIG. 3A is a schematic diagram illustrating slice image data used in sheet lamination 3D modeling, and FIG. 3B is a schematic diagram illustrating an image forming process and a post-processing process of the sheet lamination 3D modeling.

Although the details will be described later, as shown in FIG. 3A the information processing apparatus 10 generates plural pieces of slice data by slicing 3D data of a 3D model M by plural respective slicing planes. In FIG. 3A, the plural slicing planes are indicated by broken lines. The slice data represent sectional images (slice images) obtained by slicing the 3D model M by the slicing planes. One slice image is formed on each recording medium 50. Thus, slice data of plural pages are generated as a series of slice data. To form a series of slice images Mn on respective recording media 50, slice data of each page are converted into raster image data.

In the exemplary embodiment, slice data of T (first to Tth) pages are generated by slicing 3D data by T (first to Tth) slicing planes. To form T slice images Mn on respective recording media 50, the slice data of T pages are converted into raster image data of T pages.

Figure 3B:
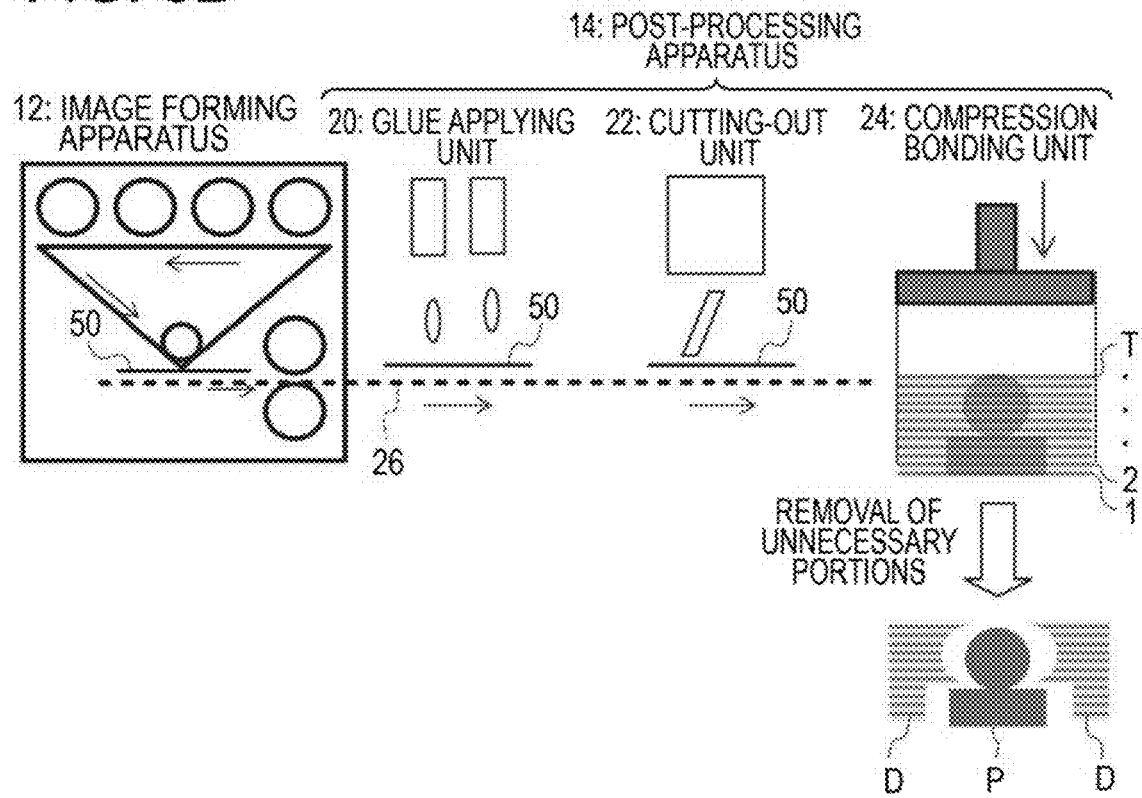
FIG. 3B is a schematic diagram illustrating an image forming process and a post-processing process of the sheet lamination 3D modeling.

As shown in FIG. 3B, in the exemplary embodiment, the image forming apparatus 12 and the post-processing apparatus 14 share a conveyance path 26. The post-processing apparatus 14 is equipped with a glue applying unit 20 which performs a glue applying operation, a cutting-out unit 22 which performs a cutting-out operation, and a compression bonding unit 24 which performs a compression bonding operation. The glue applying unit 20, the cutting-out unit 22, and the compression bonding unit 24 are arranged in this order along the conveyance path 26 for feeding recording media 50.

The image forming apparatus 12 acquires raster image data page by page, and forms a slice image on a recording medium 50 on the basis of raster image data of one page. The recording medium 50 on which the slice image has been formed is supplied to the post-processing apparatus 14. The post-processing apparatus 14 acquires control data of one page that correspond to the raster image data. The post-processing apparatus 14 performs post-processing on the received recording medium 50 uninterruptedly according to the acquired control data of one page.

In the exemplary embodiment, the image forming apparatus 12 acquires T (first to Tth) raster image data page by page in order from the first page and forms a slice image Mn on each recording medium 50 on the basis of acquired raster data of one page. An nth slice image Mn is formed on an nth recording medium $50_n$, n is a number that is one of "1" to "T." In the illustrated example, T recording media $50_1$-$50_T$ on which T respective slice images $M_1$-$M_T$ are formed are laminated in the post-processing process in order of formation of the slice images $M_1$-$M_T$, that is, in ascending order of the numbers (from to "1" to "T").

Figure 4A:
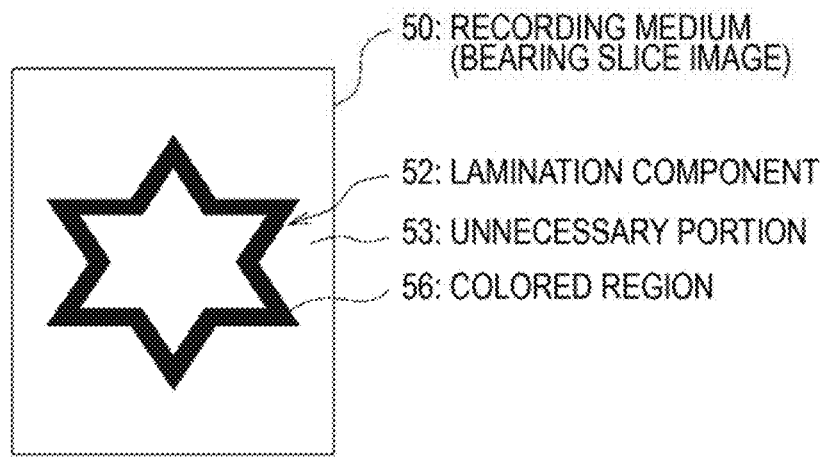
FIGS. 4A, 4B and 4C are schematic diagrams showing a slice image formed on a recording medium.
Figure 4B:
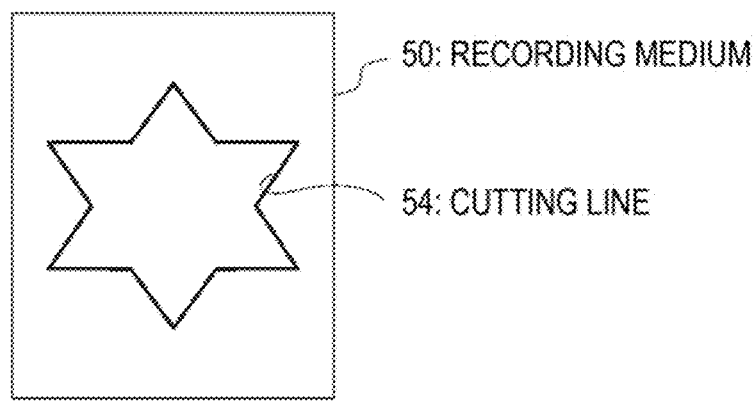
Figure 4C:
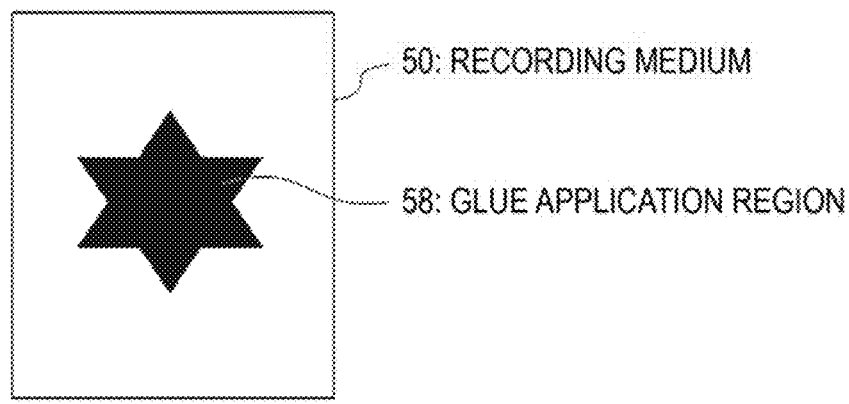

The slice image will now be described. FIGS. 4A, 4B and 4C are schematic diagrams showing an example slice image formed on a recording medium 50. As shown in FIG. 4A, a slice image formed on a recording medium 50 consists of a lamination component 52 to become part of a 3D modeled object when subjected to lamination and an unnecessary portion 53. The lamination component 52 has a colored region 56 which is a peripheral region having a preset width. As shown in FIG. 4B, the outer circumferential line of the lamination component 52 is a cutting line 54 along which to cut out the lamination component 52 from the recording medium 50.

As shown in FIG. 4C, a glue application region 58 is set inside the outer circumferential line (cutting line 54) of the lamination component 52; for example, the glue application region 58 is the region located inside and adjoining the colored region 56. Although glue may be applied to the entire surface of the recording medium 50 including the unnecessary portion 53, setting the glue application region 58 as a region located inside the outer circumferential line of the lamination component 52 makes it easier to remove removal target portions D (see FIG. 3B) than in the case that glue is applied to the entire surface of the recording medium 50. Furthermore, setting the glue application region 58 as a region located inside the outer circumferential line of the lamination component 52 prevents an event that glue sticks out of the lamination component 52 in a compression bonding operation that is performed after glue application.

A width of the colored region 56 and a retreat width of the glue application region 58 from the outer circumferential line of the lamination component 52 may be set when a user inputs instructions about 3D modeling by, for example, displaying a setting picture on a display 34 of the information processing apparatus 10 and receiving settings from the user through an operation unit 32. Alternatively, preset initial settings may be employed.

Control data include control data that specify the cutting line 54 and control data that specify the glue application region 58. For example, the control data that specify the cutting line 54 are coordinate data of points located on a route of the cutting line 54. The control data that specify the glue application region 58 are coordinate data of points existing in the glue application region 58.

Returning to the description of the post-processing process (see FIG. 3B), the recording media 50 on which the slice images are formed are supplied one by one from the image forming apparatus 12 to the glue applying unit 20. The glue applying unit 20 applies glue to the glue application region 58 of each recording medium 50 according to control data that specify the glue application region 58. For example, the glue applying unit 20 may be equipped with a glue ejection head for ejecting glue, which is moved in a lamination direction (Z direction) and directions parallel with the plane of the recording medium 50 (X and Y directions). Glue is applied to the glue application region 58 of the recording medium 50 as the glue ejection head scans the glue application region 58 while ejecting glue. Upon completion of the glue applying operation, the recording medium 50 is supplied to the cutting-out unit 22.

The cutting-out unit 22 forms a cut in each recording medium 50 along the cutting line 54 according to control data that specify the cutting line 54. For example, the cutting-out unit 22 may be a cutter having a blade. The blade of the cutter is moved in the lamination direction (Z direction) and the directions parallel with the plane of the recording medium 50 (X and Y directions). A cut is formed in the recording medium 50 by moving the blade of the cutter in the X and Y directions while pressing it against the recording medium 50.

A cutting depth is determined by adjusting the position of the blade of the cutter in the lamination direction. The cutting depth may be such that the cut does not reach the back surface of each recording medium 50, in which case the lamination component 52 is not separated from the recording medium 50 and hence can be prevented from being lost in the process of conveyance of the recording medium 50.

It suffices that the cutter have a function of forming a cut along the cutting line 54 of a recording medium 50, and the cutter is not limited to a mechanical cutter that presses a blade against a recording medium 50. For example, the cutter may be an ultrasonic cutter that forms a cut by applying ultrasonic waves to a recording medium 50 or a laser cutter that forms a cut by irradiating a recording medium 50 with laser light.

Instead of forming a cut in a recording medium 50, the cutting-out unit 22 may form plural perforations in a recording medium 50 along the cutting line 54. Where plural perforations are formed, the lamination component 52 is kept connected to the recording medium 50 and hence can be prevented from being lost in the process of conveyance of the recording medium 50 even more reliably.

Each recording medium 50 that has been subjected to the cutting operation is supplied to the compression bonding unit 24. The compression bonding unit 24 stacks received recording media 50 successively. The plural recording media $50_1$ to $50_T$ are stacked in order that the number representing each of them ascends from to "1" to "T." The compression bonding unit 24 compression-bonds the bundle of stacked plural recording media 50 together by pressing it in the lamination direction. During the pressure bonding, each of the plural glue-applied recording media $50_1$ to $50_T$ is bonded to the recording media 50 located immediately above and below in the glue application regions 58.

The recording media 50 that have been subjected to the cutting-out operation are composed of the lamination components 52 that constitute a 3D modeled object P as a result of the lamination and the unnecessary portions 53. In this state, the unnecessary portions 53 are not removed and remain parts of the recording media 50. The unnecessary portions 53 serve as a support member for supporting the 3D modeled object P that is a laminate of the lamination components 52. After completion of the lamination operation of the compression bonding unit 24, removal target portions D are separated from the laminate of the lamination components 52 of the recording media 50, whereby the 3D modeled object P are separated.

Figure 5A:
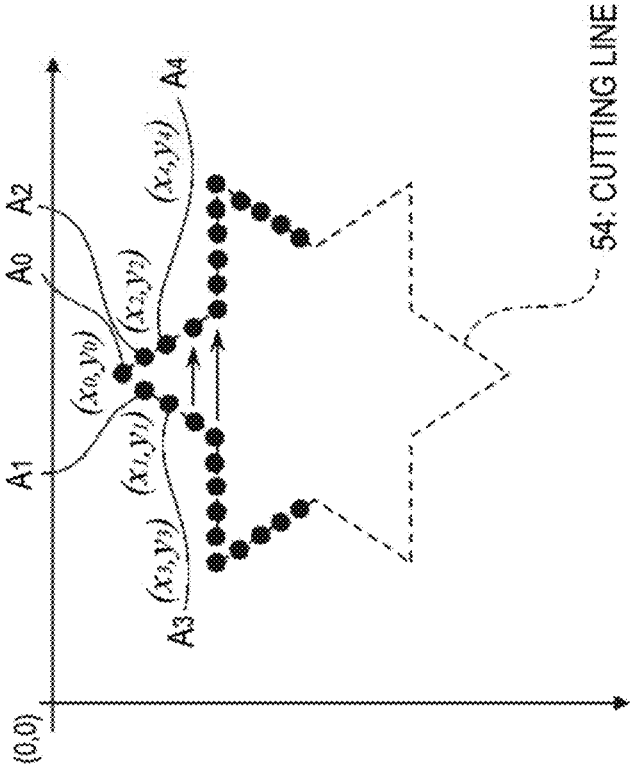
FIGS. 5A and 5B are schematic diagrams illustrating examples of control data that specify a cutting line.
Figure 5B:
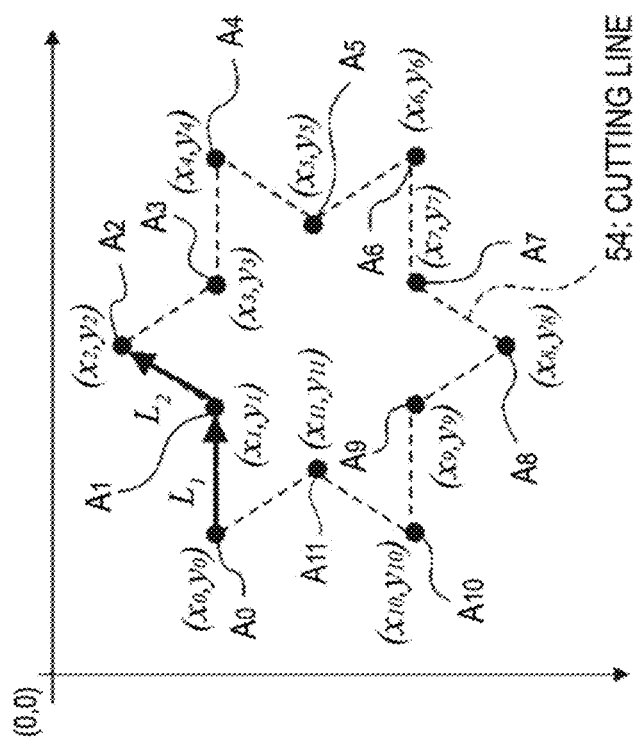
Figure 6A:
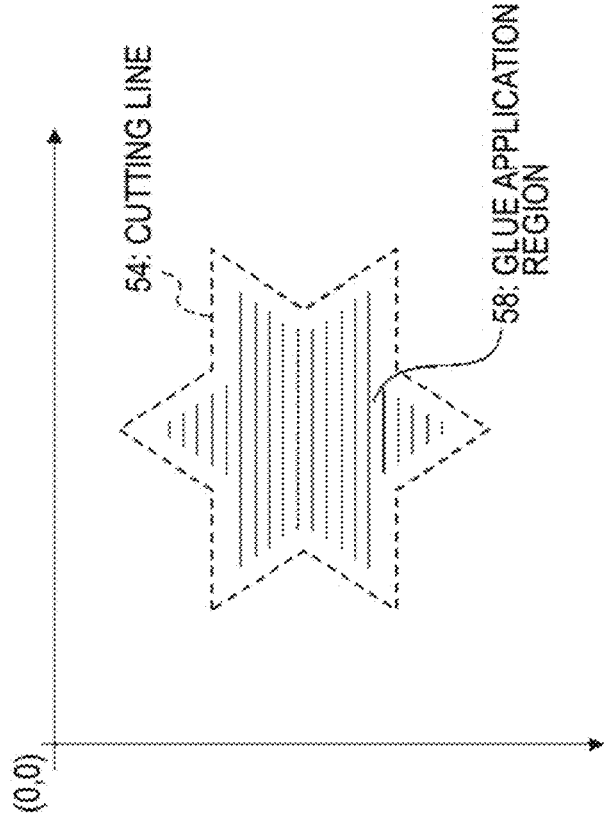
FIGS. 6A and 6B are schematic diagrams illustrating examples of control data that specify a glue application region.
Figure 6B:
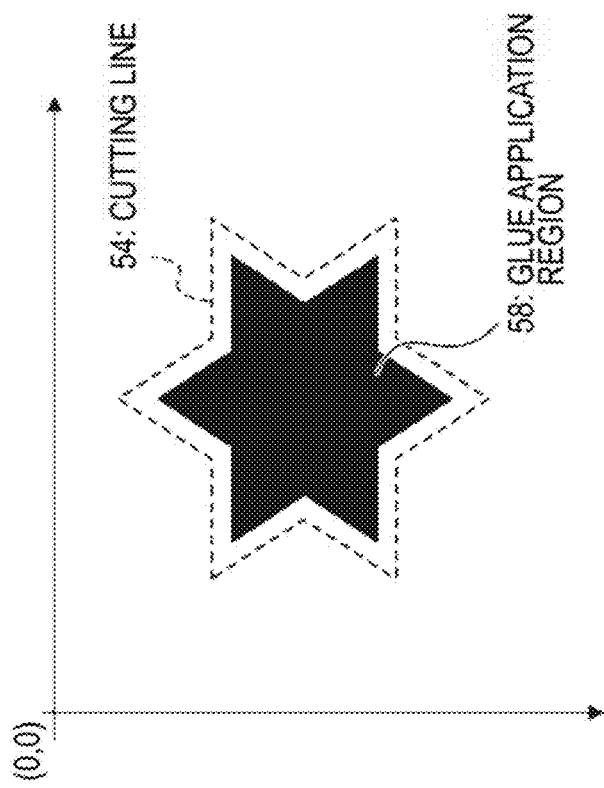

Next, examples of control data will be described. FIGS. 5A and 5B are schematic diagrams illustrating examples of control data that specify a cutting line 54. FIGS. 6A and 6B are schematic diagrams illustrating examples of control data that specify a glue application region 58. As described later, slice data include coordinate data of apices of intersection regions where polygons intersect a slicing plane. The intersection regions exist along the outer circumferential line of a lamination component 52. Thus, as shown in FIG. 5A, coordinate data of respective points located on the route of a cutting line 54, such as coordinates ($x_0$, $y_0$) of point $A_0$, are made control data that specify the cutting line 54.

In the illustrated example, a star-shaped lamination component 52 has twelve apices $A_0$ to $A_{11}$. For example, if point $A_0$ is employed as a start point, the cutting line 54 is specified by tracing the points $A_0$ to $A_{11}$ in order of $A_0 \rightarrow A_2 \rightarrow A_3 \rightarrow A_4 \rightarrow A_5 \rightarrow A_6 \rightarrow A_7 \rightarrow A_8 \rightarrow A_9 \rightarrow A_{10} \rightarrow A_{11}$.

As shown in FIG. 5B, where plural perforations are to be formed, coordinate data of respective perforations located on the route of a cutting line 54 are made control data that specify the cutting line 54. For example, if point $A_0$ is employed as a start point, the cutting line 54 is specified by tracing points of the perforations in order of their formation (e.g., $A_0 \rightarrow A_2 \rightarrow A_3 \rightarrow A_4 \ldots$).

As shown in FIG. 6A, coordinate data of respective points of a glue application region 58 are made control data that specify the glue application region 58. The glue application region 58 is one size smaller than the lamination component 52 and is set inside the outer circumferential line of the lamination component 52. A glue application region 58 may be specified by reducing the image of the lamination component 52. In this case, the glue application region 58 is disposed so that its canter of gravity coincides with that of the image of the lamination component 52. Coordinate data of respective points of the glue application region 58 are determined on the basis of its retreat width from the outer circumferential line of the lamination component 52 and coordinate data of points located on the route of the cutting line 54.

As shown in FIG. 6B, it is not necessary to apply glue over the entire glue application region 58. Glue may be applied in selected portions of the glue application region 53. Furthermore, the glue density need not be constant over the entire glue application region 58. Where the glue density is set variable, the glue density may be set higher in a peripheral region of the glue application region 58 than in its central region.

The origin of control data that specify a cutting line 54 and the origin of control data that specify a glue application region 58 are set the same as the origin of slice image formation. Where the post-processing apparatus 14 has an image reading function, a procedure may be employed that the image forming apparatus 12 forms a mark image indicating the origin of control data on a recording medium 50 together with a slice image and the post-processing apparatus 14 acquires position information indicating the origin of control data by reading the mark image.

The form of control data is not limited to coordinate data. For example, control data may be image data in which a cutting line 54, a glue application region 58, etc. are represented by figures or images, such as binary raster image data.

In the case of binary raster image data, in the example shown in FIG. 4B, the pixel values of the cutting line 54 are made "1" and those of the other regions are made "0." In the example shown in FIG. 4C, the pixel values of the glue application region 58 are made "1" and those of the other regions are made "0." For example, the glue election head of the glue applying unit 20 ejects glue toward a recording medium 50 when the pixel value is equal to "1" and does not eject glue toward the recording medium 50 when the pixel value is equal to "0."

<Information Processing Apparatus 10>

Figure 7:
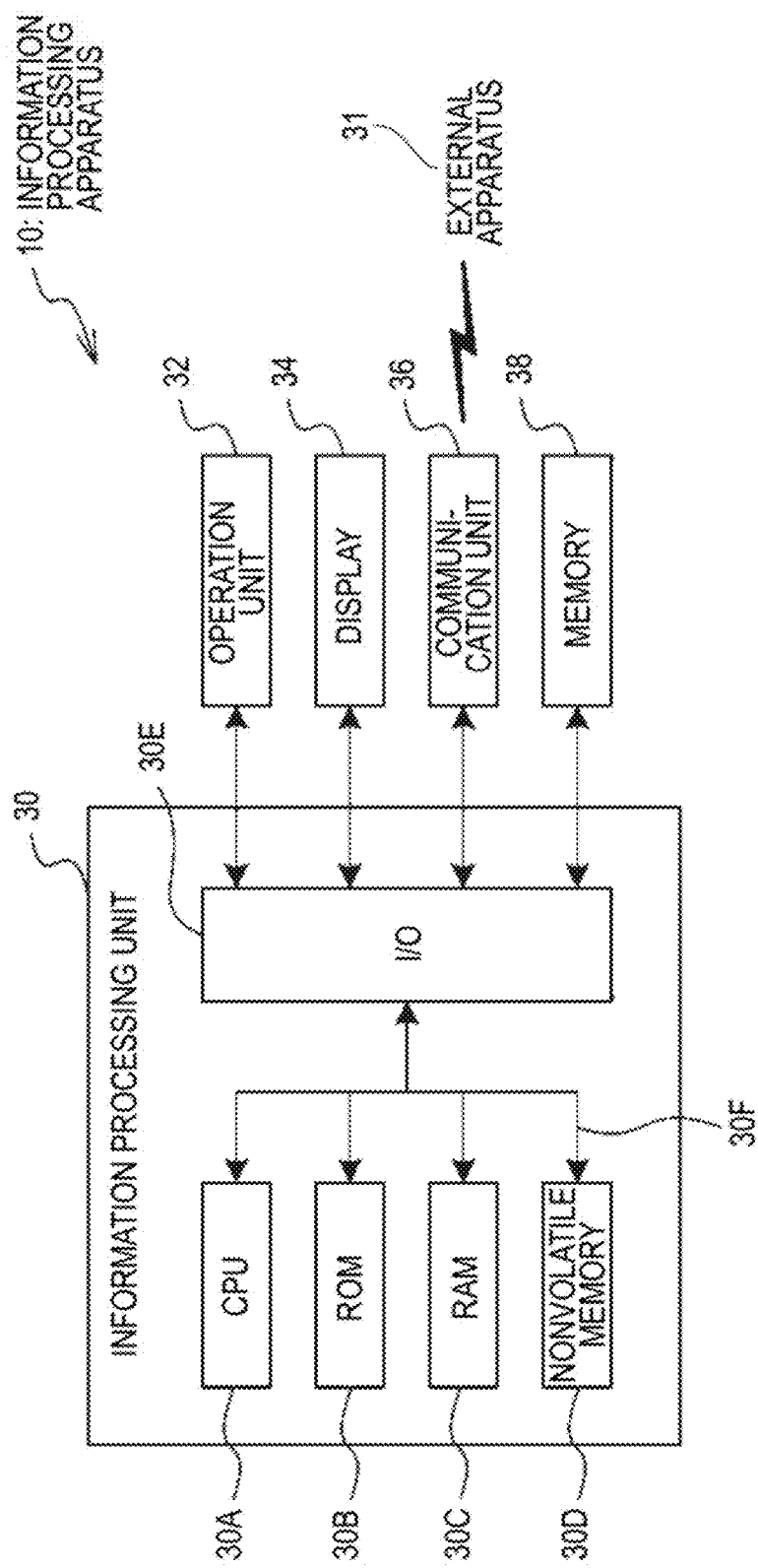
FIG. 7 is a block diagram showing an example electrical configuration of an information processing apparatus according to the exemplary embodiment.

Next, the information processing apparatus 10 according to the exemplary embodiment of the invention will be described. FIG. 7 is a block diagram showing the electrical configuration of the information processing apparatus 10 according to the exemplary embodiment. As shown in FIG. 7, the information processing apparatus 10 is equipped with an information processing unit 30, an operation unit 32 for receiving a user manipulation, a display 34 for displaying information to a user, a communication unit 36 for communicating with an external apparatus 31, and a memory 38 such as an external storage device. The operation unit 32, the display 34, the communication unit 36, and the memory 38 are connected to an input/output interface (I/O) 30E of the information processing unit 30.

The information processing unit 30 is equipped with a CPU (central processing unit) 30A, a ROM (read-only memory) 30B, a RAM (random access memory) 30C, a nonvolatile memory 30D, and the I/O 30E. The CPU 30A, the ROM 30B, the RAM 30C, the nonvolatile memory 30D, and the I/O 30E are connected to each other by a bus 30F. The CPU 30A reads out a program from the ROM 30B and executes the program using the RAM 30C as a working area.

The operation unit 32 receives a user manipulation through a mouse, a keyboard, etc. The display 34 displays various pictures to a user using a display device. The communication unit 36 communicates with the external apparatus 31 through a wired or wireless communicate line. For example, the communication unit 36 functions as an interface for communicating with the external apparatus 31 such as a computer that is connected to a network such as the Internet. The memory 38 is equipped with a storage device such as a hard disk drive.

Figure 8:
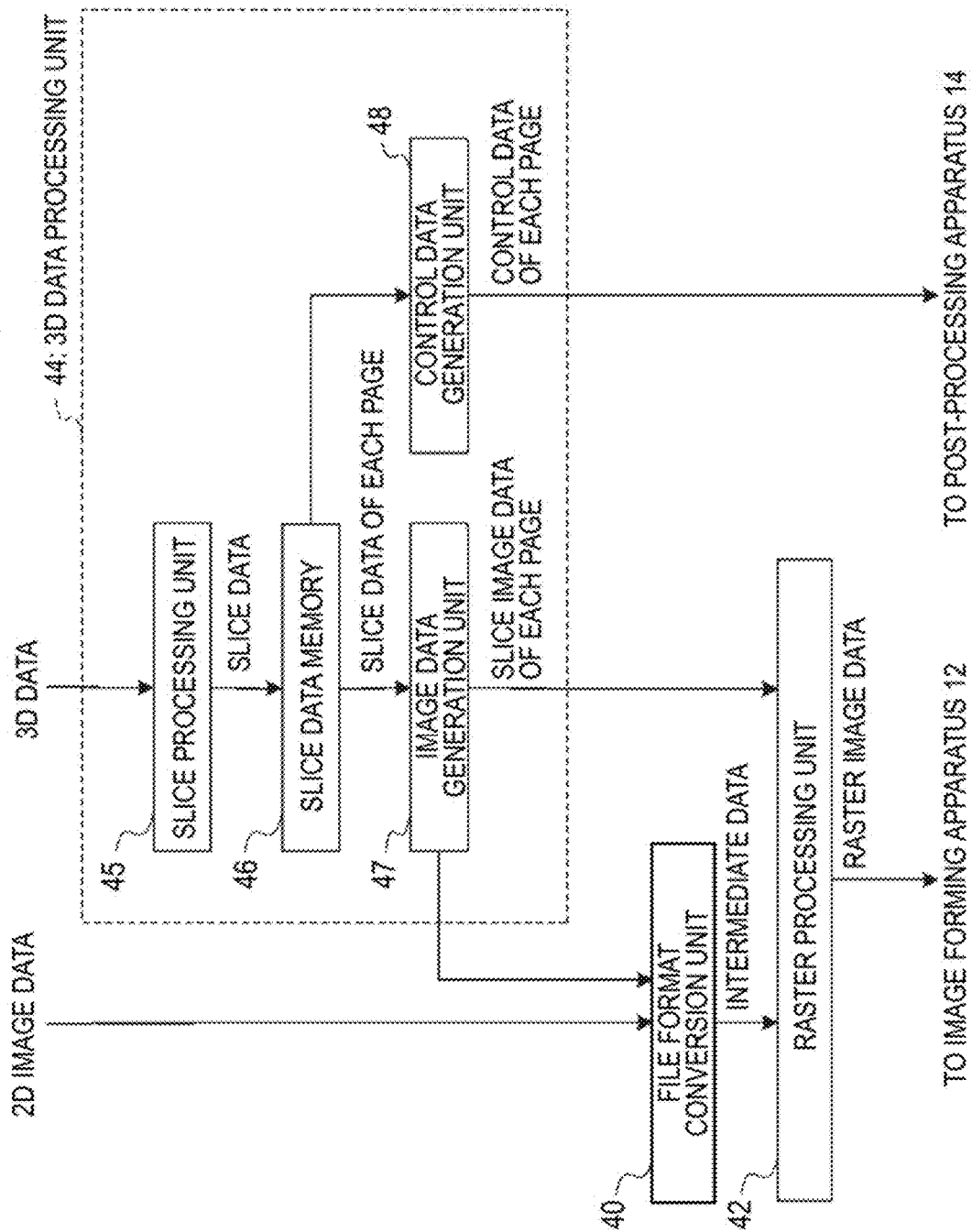
FIG. 8 is a block diagram showing an example functional configuration of the information processing apparatus according to the exemplary embodiment.

FIG. 8 is a block diagram showing the functional configuration of the information processing apparatus 10 according to the exemplary embodiment. As shown in FIG. 8, the information processing apparatus 10 is equipped with a file format conversion unit 40, a raster processing unit 42, and a 3D data processing unit 44.

When receiving data written in a page description language (hereinafter referred to as "PDL data"), the file format conversion unit 40 converts the received PDL data into intermediate data.

The raster processing unit 42 generates raster image data by rasterizing the intermediate data produced by the file format conversion unit 40. Furthermore, the raster processing unit 42 generates raster image data by rasterizing slice image data generated by an image data generation unit 47 (described later).

The 3D data processing unit 44 generates slice image data and control data by processing received 3D data. More specifically, the 3D data processing unit 44 is equipped with a slice processing unit 45, a slice data memory 46, the image data generation unit 47, and a control data generation unit 48.

The slice processing unit 45 generates slice data of plural pages on the basis of received 3D data. The slice data memory 46 stores the slice data of plural pages generated by the slice processing unit 45. The image data generation unit 47 reads out slice data of each page from the slice data memory 46, and generates slice image data on the basis of the read-out slice data. The control data generation unit 48 reads out the same slice data as the image data generation unit 47 does and generates control data on the basis of the read-out slice data.

(2D Data Processing)

Two-dimensional data processing on 2D image data will be described below. When image formation based on 2D image data is commanded, the 2D image data are data that have been acquired as PDL data. The PDL data are converted by the file format conversion unit 40 into intermediate data, which are output to the raster processing unit 42. The intermediate data are rasterized by the raster processing unit 42 into raster image data, of 2D images, which are output to the image forming apparatus 12.

The intermediate data are interval data produced by dividing each of objects (e.g., font characters, graphic figures, and image data) that are image elements of each page image into intervals of respective raster scanning lines. Each piece of interval data includes sets of coordinates of the two ends of the interval concerned and pieces of information indicating pixel values of respective pixels in the interval. The data transfer rate in the information processing apparatus 10 is increased because the PDL data are converted into the intermediate data and then the latter are transferred.

(3D Data Processing)

Three-dimensional data processing on 3D data will be described below. When 3D modeling based on 3D data is commanded, 3D data of a 3D model M are acquired. The slice processing unit 45 generates slice data of plural pages on the basis of the 3D data, and stores the generated slice data of plural pages in the slice data memory 46. The 3D data and the slice data will be described below in detail.

For example, the 3D data of the 3D model M are OBJ format 3D data (hereinafter referred to as "OBJ data"). In the case of OBJ data, the 3D model M is expressed as a set of polygons (triangles). Alternatively, the 3D data may be of another format such as the STL format. Since STL format 3D data have no color information, color information is added when STL format 3D data are used.

The following description will be directed to the case that the 3D data are OBJ data. The OBJ data include an OBJ file relating to shape data and an MTL file relating to color information. In the OBJ file, surface numbers specific to respective polygons (triangles), coordinate data of the apices of the polygons, etc. are defined so as to be correlated with the respective polygons. In the MTL file, pieces of color information are defined so as to be correlated with the respective polygons.

Planes that are parallel with a ground surface (XY plane) on which the 3D model M is placed are employed as slicing planes. For example, a lowest layer of the 3D model M is set as a first slicing plane. Slice data are generated every time the slicing surface is shifted by a predetermined lamination pitch (distance) p in a lamination direction (Z-axis direction).

The lowest slicing plane is given a number "1" and the slicing plane number is increased by "1" every time the slicing plane is shifted. The example shown in FIG. 3A has T slicing planes having numbers "1" to "T" (indicated by broken lines). Slice data represent sectional images (slice images) obtained by slicing the 3D model M by the slicing planes, respectively. More specifically, slice data of each page represents a sectional image (slice image) of the 3D model M in the form of a slicing plane number, coordinate data of the apices of intersection regions where polygons intersect the slicing plane, and pieces of color information that are set for the respective polygons that intersect the slicing plane. Slice data of T (first to Tth) pages are generated by the T respective slicing planes.

The image data generation unit 47 generates slice image data of one page on the basis of slice data of each page that is read out from the slice data memory 46. The slice data are converted into slice image data of a file format such as JPEG. In generating slice image data, colored regions may be added so as to be reflected in a corresponding slice image. The generated slice image data are output to the raster processing unit 42. The raster processing unit 42 generates raster image data by rasterizing the slice image data generated by the image data generation unit 47, and outputs the generated raster image data to the image forming apparatus 12.

Alternatively, the image data generation unit 47 may be configured so as to cause generation of intermediate data. In this case, the image data generation unit 47 generates PDL data of one page on the basis of slice data of each page that are read out from the slice data memory 46, and outputs the generated PDL data of one page to the file format conversion unit 40. The file format conversion unit 40 converts the PDL data into intermediate data, and outputs the intermediate data to the raster processing unit 42. The raster processing unit 42 generates raster image data of a slice image by rasterizing the intermediate data, and outputs the generated raster image data to the image forming apparatus 12.

The control data generation unit 48 generates control data of one page on the basis of slice data of each page that are read out from the slice data memory 46, and outputs the generated control data of one page to the post-processing apparatus 14.

<Information Processing Program>

In the exemplary embodiment, if instructed to work for image formation based on 2D image data during execution of a 3D data process, the information processing apparatus 10 suspends the 3D data process and starts a 2D data process as an interrupt process. That is, the information processing apparatus 10 accepts an interrupt process.

Figure 9:
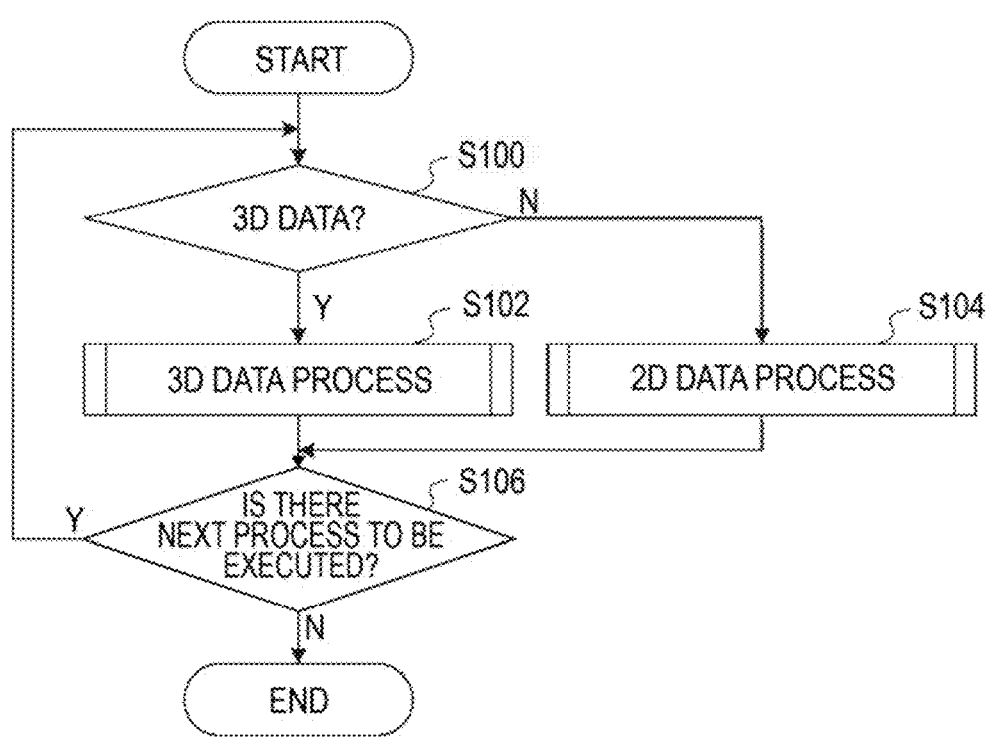
FIG. 9 is a flowchart showing a processing procedure of a case that no interrupt process is accepted.

First, a processing procedure of a case that no interrupt process is accepted will be described as a comparative example. FIG. 9 is a flowchart showing a processing procedure of a case that no interrupt process is accepted.

First, at step S100, the CPU 30A judges whether data relating to an instruction are 3D data. If 3D modeling based on 3D data is commanded, the CPU 30A executes the process shown in step S102. If not, the CPU 30A executes the process shown in step S104, that is, performs the above-described 2D data processing.

At step S106, the CPU 30A judges whether there is a next process to be executed. If receiving an instruction to perform 2D image formation or 3D modeling during execution of the 3D data processing or 2D data processing, the CPU 30A executes the process shown in step S100 (steps S100-S106 are executed again) because there is a next process to be executed. If judging at step S106 that there is no next process to be executed, the CPU 30A finishes the routine.

In the image forming apparatus 12, high-speed processing of several hundred pages per minute, for example, is possible. On the other hand, the processing speed (lamination rate) of the post-processing apparatus 14 is as very low as about several millimeters per hour. Thus, in the in-line 3D modeling system, the processing speed of a process to manufacture of a 3D modeled object, that is, the processing speed of a 3D data process, is limited by the processing speed of the post-processing apparatus 14.

In the processing procedure shown in FIG. 9, the information processing apparatus 10 does not accept interruption of a 2D data process. Thus, once starting a 3D data process, the information processing apparatus 10 cannot execute a 2D data process during execution of the 3D data process. If the 3D modeling system is occupied by a 3D data process in this manner, image formation based on 2D image data can hardly be performed and the processing ability of the image forming apparatus 12 is lowered accordingly.

Figure 10:
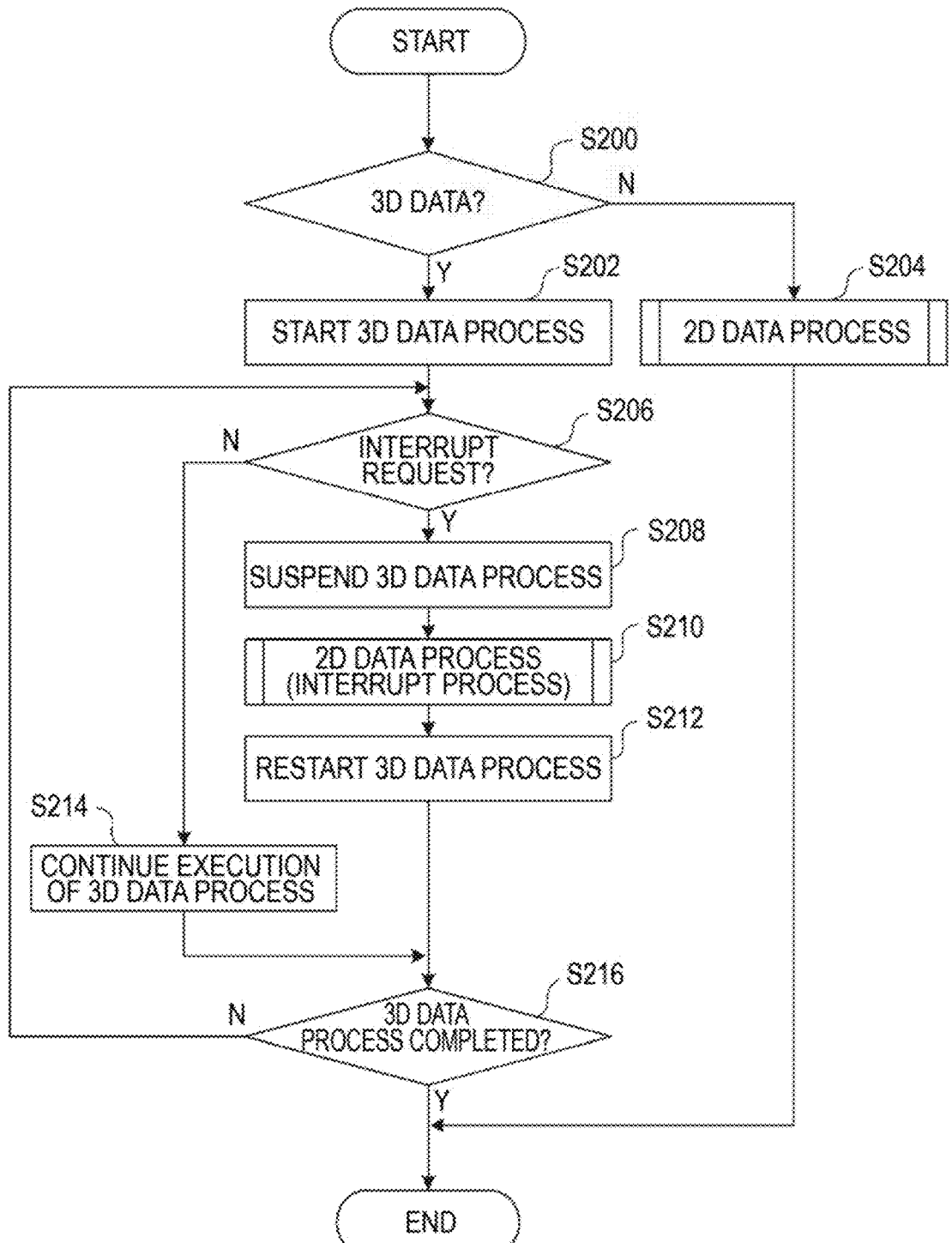
FIG. 10 is a flowchart showing an example processing procedure of an information processing program according to the first exemplary embodiment of the invention.

Next, an information processing program according to the exemplary embodiment will be described. As mentioned above, in the exemplary embodiment, the information processing apparatus 10 accepts an interrupt process. FIG. 10 is a flowchart showing an example processing procedure of the information processing program according to the first exemplary embodiment of the invention. The information processing program is stored in the ROM 30B of the information processing apparatus 10. The information processing program is read out from the ROM 30B and executed by the CPU 30A of the information processing apparatus 10. Execution of the information processing program is started upon reception of an image formation instruction or a 3D modeling instruction from a user.

Although the exemplary embodiment is directed to the case that the information processing program is stored in the ROM 30B of the information processing apparatus 10 in advance, the invention is not limited to this case. For example, the information processing program may be provided being stored in a computer-readable, portable storage medium such as a magneto-optical disc, a CD-ROM (compact disc-read only memory), or a USB memory or provided over a network.

As shown in FIG. 10, at step S200, the CPU 30A judges whether data relating to an instruction is 3D data. If 3D modeling based on 3D data is commanded, the CPU 30A executes the process shown in step S202, that is, starts execution of a 3D data process (details were described above). On the other hand, if image formation based on 2D image data is commanded, the CPU 30A executes the process shown in step S204, that is, performs a 2D data process (details were described above). This routine is finished upon completion of the execution of the 2D data process.

At step S206, the CPU 30A judges whether an interrupt request has been received during the execution of the 3D data process. If an instruction to perform 2D image formation has been received, the CPU 30A executes the process shown in step S208. The CPU 30A suspends the execution of the 3D data process at step S208 and executes the 2D data process at step S210. At step S212, the CPU 30A restarts the 3D data process whose execution has been suspended. On the other hand, it is judged at step S206 that no interrupt request has been received, the CPU 30A executes the process shown in step S214 to execute the 3D data process without interruption.

At step S216, the CPU 30A judges whether the 3D data process has been completed. The CPU 30A makes this judgment during execution of the 3D data process irrespective of whether the 3D data process was restarted after suspension or has been executed continuously without interruption. If the 3D data process has not been completed yet, the CPU 30A executes the process shown in step S206 to judge again whether an interrupt request has been received during the execution of the 3D data process. On the other hand, this routine is finished if the 3D data process has been completed.

<Main Operation of 3D Modeling System>

Figure 11:
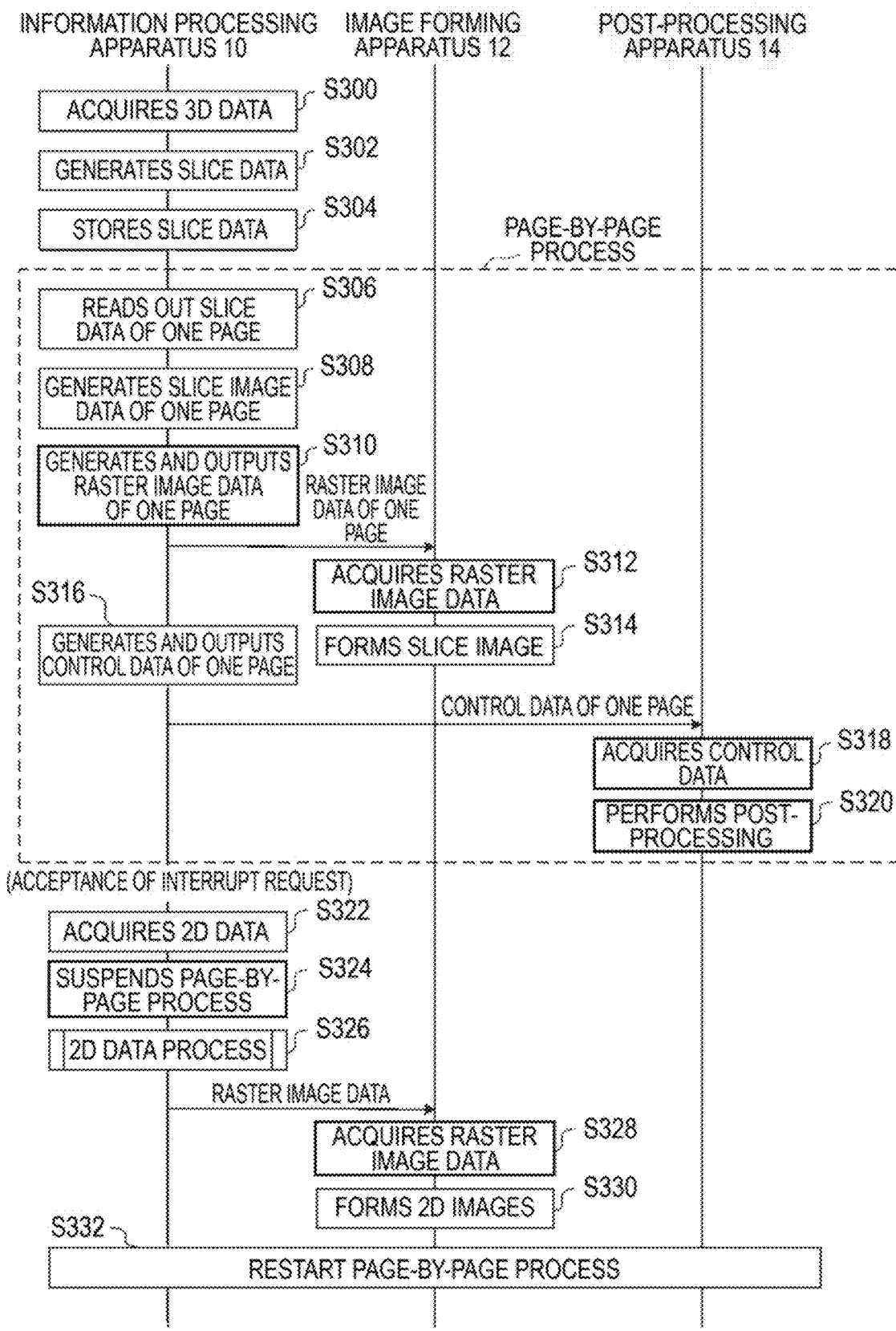
FIG. 11 is a sequence diagram illustrating a main operation of the 3D modeling system according to the first exemplary embodiment.

A main operation of the 3D modeling system according to the first exemplary embodiment will now be described. FIG. 11 is a sequence diagram illustrating a main operation of the 3D modeling system according to the first exemplary embodiment. As shown in FIG. 11, upon receiving 3D data at steps S300, at step S302 the information processing apparatus 10 generates slice data of plural pages on the basis of the received 3D data. At step S304, the information processing apparatus 10 stores the slice data of plural pages generated at step S304.

The information processing apparatus 10 reads out slice data of one page at step S306 and generates slice image data of one page on the basis of the read-out slice data of one page. At step S310, the information processing apparatus 10 generates raster image data of one page from the slice image data of one page and outputs the generated raster image data of one page to the image forming apparatus 12.

The image forming apparatus 12 acquires the raster image data of one page at step S312, and forms a slice image on a recording medium 50 on the basis of the acquired raster image data of one page at step S314. The recording medium 50 on which the slice image has been formed is supplied to the post-processing apparatus 14.

At step S316, the information processing apparatus 10 reads out the same control data as it did at step S306, generates control data of one page on the basis of the read-out slice data of one page, and outputs the generated control data of one page to the post-processing apparatus 14. The control data of one page are data for allowing the post-processing apparatus 14 to perform post-processing on the recording medium 50 on which the slice image has been formed by the image forming apparatus 12 on the basis of the received raster image data of one page.

The post-processing apparatus 14 acquires the control data of one page at step S318, and performs post-processing on the recording medium 50 on which the slice images has been formed, according to the control data at step S320.

Steps S306-S320 are executed repeatedly for each piece of slice data of one page, whereby a slice image is formed on a recording medium 50 by the image forming apparatus 12 for each piece of slice data of one page and post-processing is performed by the post-processing apparatus 14 on the recording medium 50 on which the slice image has been formed. This process which is executed repeatedly page by page is referred to as a "page-by-page process." In the page-by-page process, raster image data and control data are output at a rate that is suitable for a processing speed of the post-processing apparatus 14.

If instructed to work for image formation based on 2D image data during execution of the page-by-page process, the information processing apparatus 10 accepts the interrupt request. At step S322, the information processing apparatus 10 acquires 2D image data. The information processing apparatus 10 suspends the page-by-page process at step S324, and executes a 2D data process at step S326. As a result, the 2D image data are converted into raster image data, which are supplied to the image forming apparatus 12.

The image forming apparatus 12 acquires the raster image data for formation of 2D images at step S328, and forms 2D images on respective recording media 50 on the basis of the acquired raster image data at step S330. The recording media 50 on which the 2D images have been formed pass through the post-processing apparatus 14 and stored in a storing mechanism that is disposed at a downstream end of the system. At step S332, the information processing apparatus 10 restarts the page-by-page process that has been suspended.

After the suspension of the page-by-page process, image formation based on 2D image data, formation of remaining slice images, and a remaining part of the post-processing of the 3D modeling process are executed in the above-described order. In the exemplary embodiment, a 2D data process is executed by interrupting a 3D data process (page-by-page process) and the 3D data process is restarted after completion of the 2D data process. Since the image formation based on the 2D image data is executed preferentially over the other processes, the processing ability of the image forming apparatus 12 is not lowered. Formation of remaining slice images and a remaining part of the post-processing of the 3D modeling process are performed together.

Exemplary Embodiment 2

Figure 12:
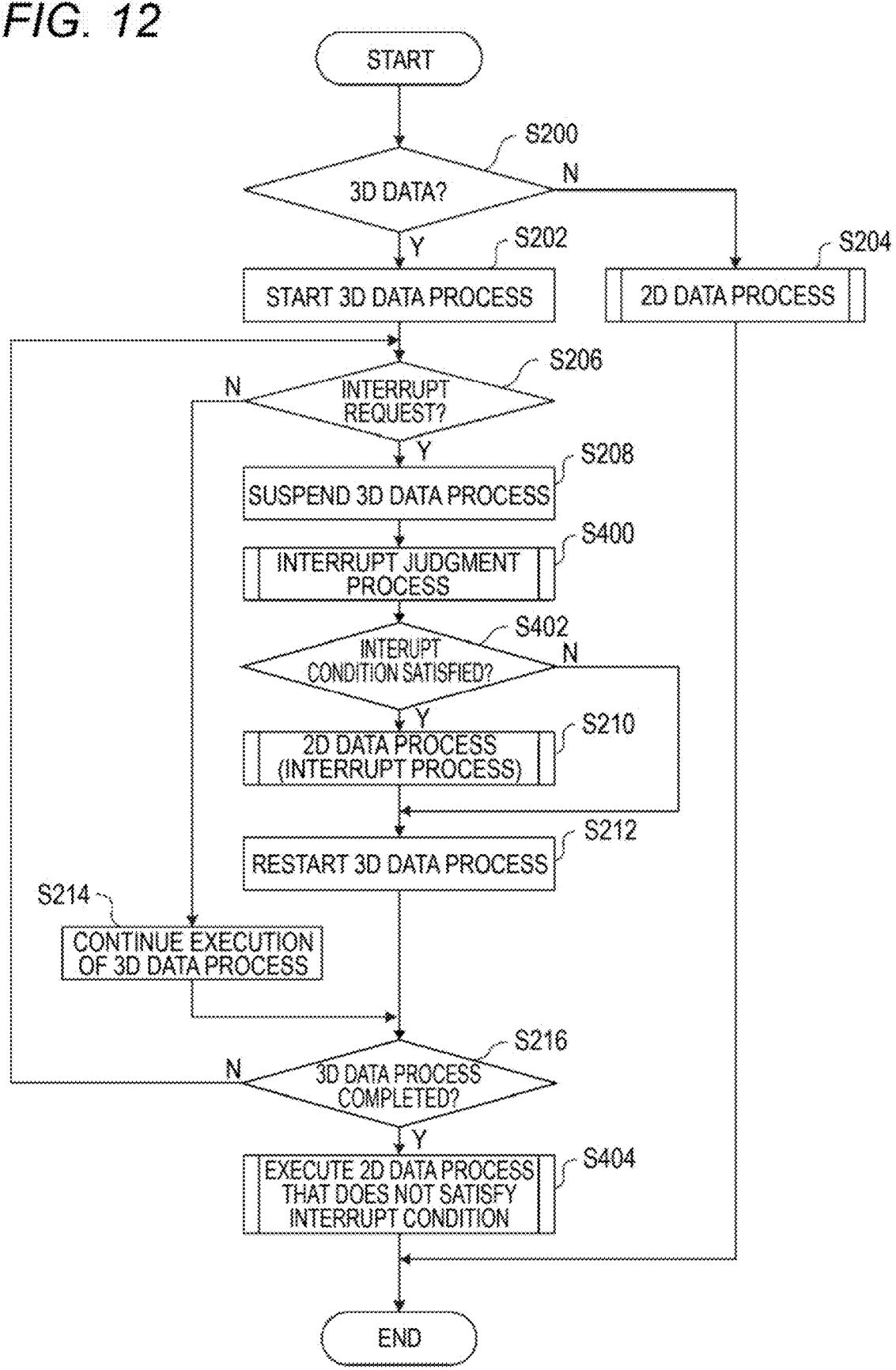
FIG. 12 is a flowchart showing an example processing procedure of an information processing program according to a second exemplary embodiment of the invention.

A second exemplary embodiment is the same as the first exemplary embodiment except that in the former an interrupt process is accepted conditionally, and hence only difference from the first exemplary embodiment will be described. FIG. 12 is a flowchart showing an example processing procedure of an information processing program according to the second exemplary embodiment of the invention. Steps of the information processing program according to the second exemplary embodiment having the same steps in the information processing program according to the first exemplary embodiment (see FIG. 10) will be given the same reference symbols as the latter and described in simplified manners.

As shown in FIG. 12, after starting a 3D data process at step 202, the CPU 30A judges at step S206 whether an interrupt request has been received during the execution of the 3D data process. If an interrupt request has been received, at step S208 the CPU 30A suspends the execution of the 3D data process. On the other hand, if judging at step S206 that no interrupt request has been received, the CPU 30A executes the process shown in steps S214 to execute the 3D data process without interruption.

Figure 13:
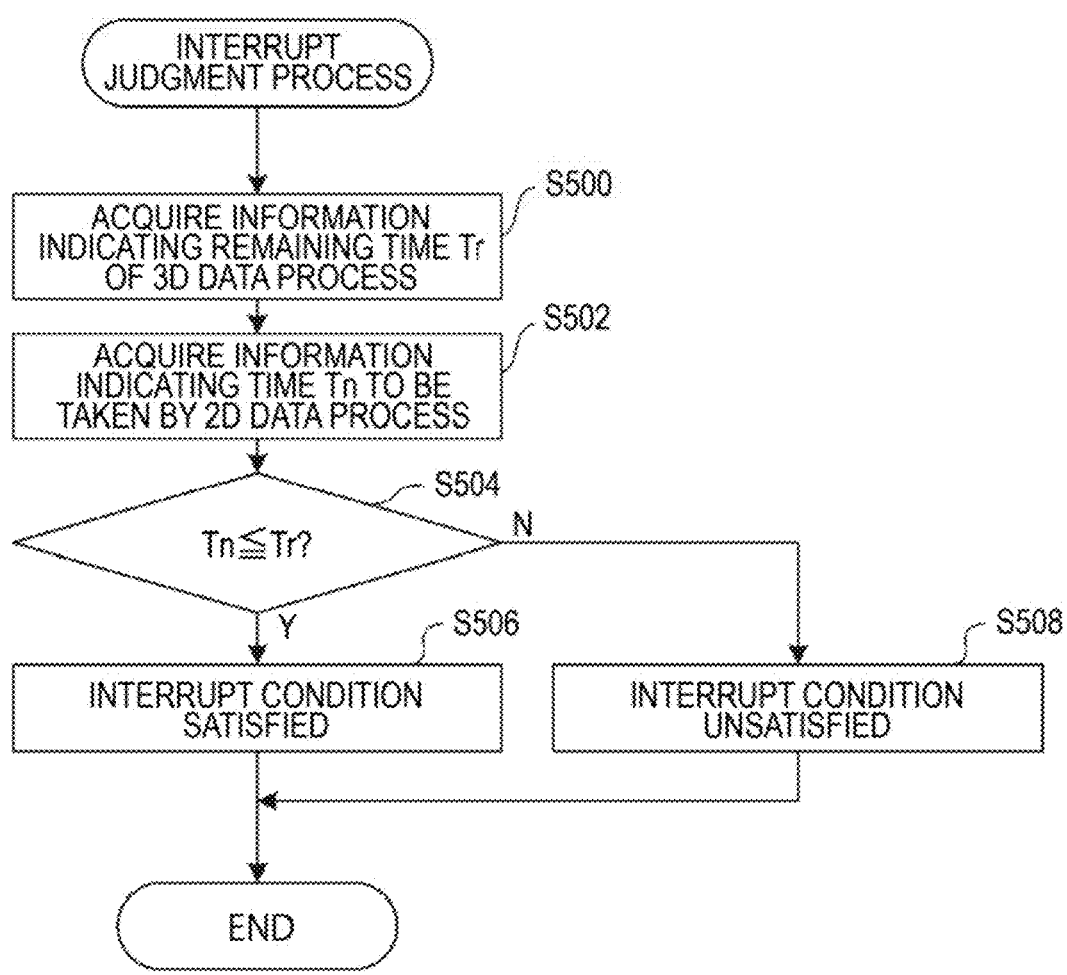
FIG. 13 is a flowchart showing an example processing procedure of the interrupt judgment process.

In the exemplary embodiment, the CPU 30A executes an interrupt judgment process at step S400. The interrupt judgment process will be described below. FIG. 13 is a flowchart showing a processing procedure of the interrupt judgment process. As shown in FIG. 13, the CPU 30A acquires information indicating a remaining time Tr of the 3D data process at step S500 and acquires information indicating a time Tn to be taken by a 2D data process at step S502. At step S504, the CPU 30A judges whether the time Tn is shorter than or equal to the remaining time Tr. If Tn≤Tr, the CPU 30A judges at step S506 that the interrupt condition is satisfied and finishes this routine. If Tn>Tr, the CPU 30A judges at step S508 that the interrupt condition is not satisfied and finishes this routine.

Returning to the flowchart of FIG. 12, at step S402, the CPU 30A judges whether the interrupt condition is satisfied on the basis of the result of the interrupt judgment process. If the interrupt condition is satisfied, the CPU 30A executes the process shown in step S210 (2D data process). At step S212, the CPU 30A restarts the 3D data process that has been suspended. On the other hand, if the interrupt condition is not satisfied, the CPU 30A goes to step S212 skipping step S210 to restart the 3D data process that has been suspended.

At step S216, the CPU 30A judges whether the 3D data process has been completed. If the 3D data process has not been completed yet, the CPU 30A executes the process shown in step S206 to judge again whether an interrupt request has been received during the execution of the 3D data process. On the other hand, if the 3D data process has been completed, the CPU 30A executes the 2D process that does not satisfy the interrupt condition at step S404 and finishes this routine.

Figure 14:
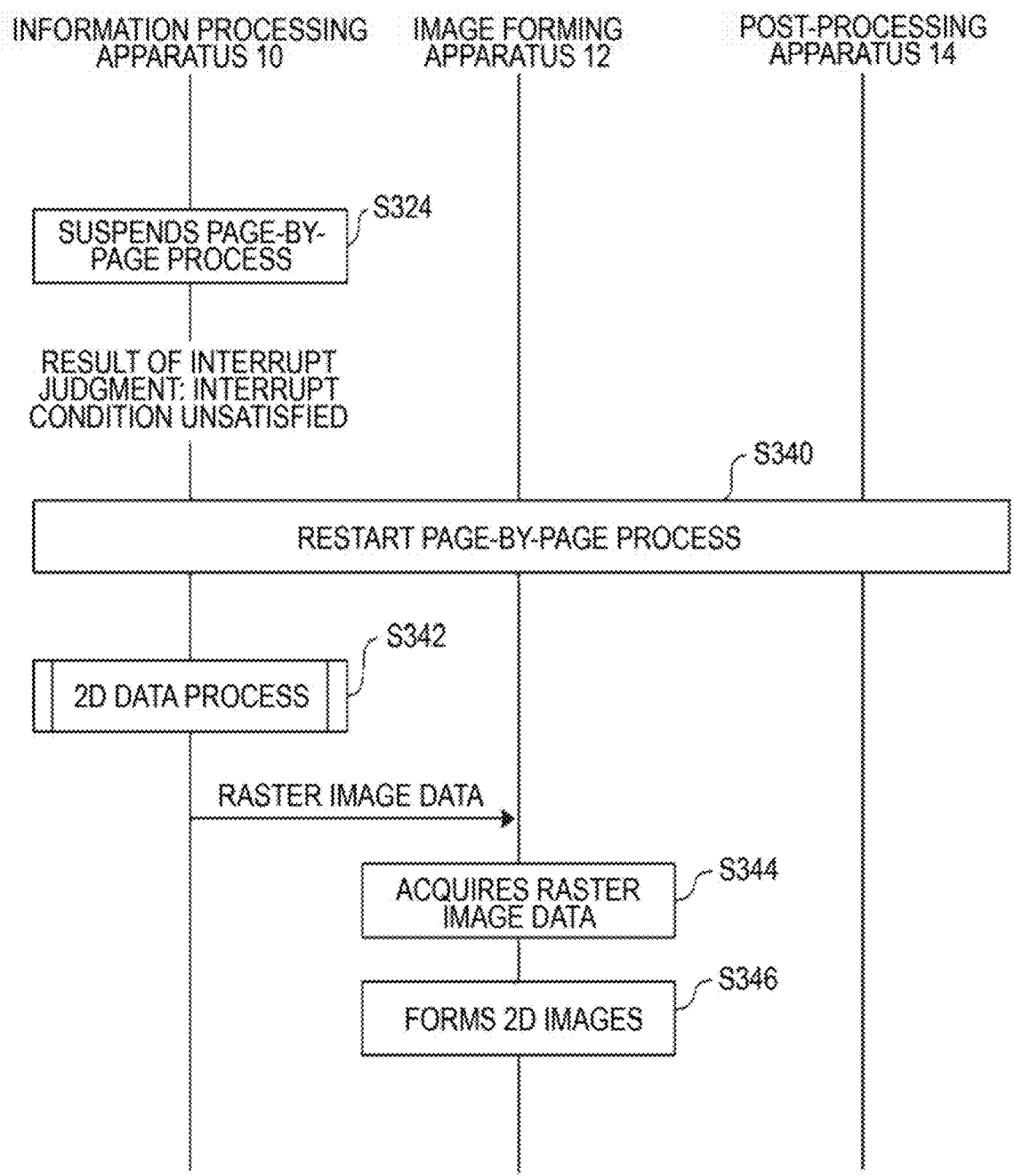
FIG. 14 is a sequence diagram illustrating an operation that the 3D modeling system performs after a judgment that an interrupt condition is not satisfied is made in the interrupt judgment process.

A description will be made of a main operation that the 3D modeling system performs following a judgment that the interrupt condition is not satisfied. FIG. 14 is a sequence diagram illustrating an operation that the 3D modeling system performs after a judgment that the interrupt, condition is not satisfied is made in an interrupt judgment process. As shown in FIG. 14, the information processing apparatus 10 executes the interrupt judgment process after suspending a page-by-page process at step S324. However, if the interrupt condition is not satisfied, the information processing apparatus 10 does not execute an interrupt process and restarts a 3D data process at step S340.

At step S342 (i.e., after completion of the 3D data process), the information processing apparatus 10 executes the 2D data process that was judged not to satisfy the interrupt condition. Two-dimensional image data are converted into raster image data, which are output to the image forming apparatus 12.

The image forming apparatus 12 acquires the raster image data for formation of 2D images at step S344 and forms 2D images on respective recording media 50 on the basis of the raster image data at step S346. The recording media 50 on which the 2D images have been formed pass through the post-processing apparatus 14 and stored in a storing mechanism which is disposed at a downstream end of the system.

In the exemplary embodiment, a 3D data process is interrupted in the midst of its execution and a 2D data process is started if a time Tn to be taken by the 2D data process is shorter than or equal to a remaining time Tr of the 3D data process. In other words, a 2D data process will be executed later if the time Tn is longer than the remaining time Tr. Thus, the processing ability of the image forming apparatus 12 is not lowered. Furthermore, the delay of 3D modeling is made shorter than in a case that an interrupt 2D data process is always executed upon its occurrence.

Also in this exemplary embodiment, formation of remaining slice images and a remaining part of post-processing of a 3D modeling process are performed together. That is, a page-by-page process of the 3D data process is restarted upon completion of an interrupt 2D data process.

Exemplary Embodiment 3

Figure 15:
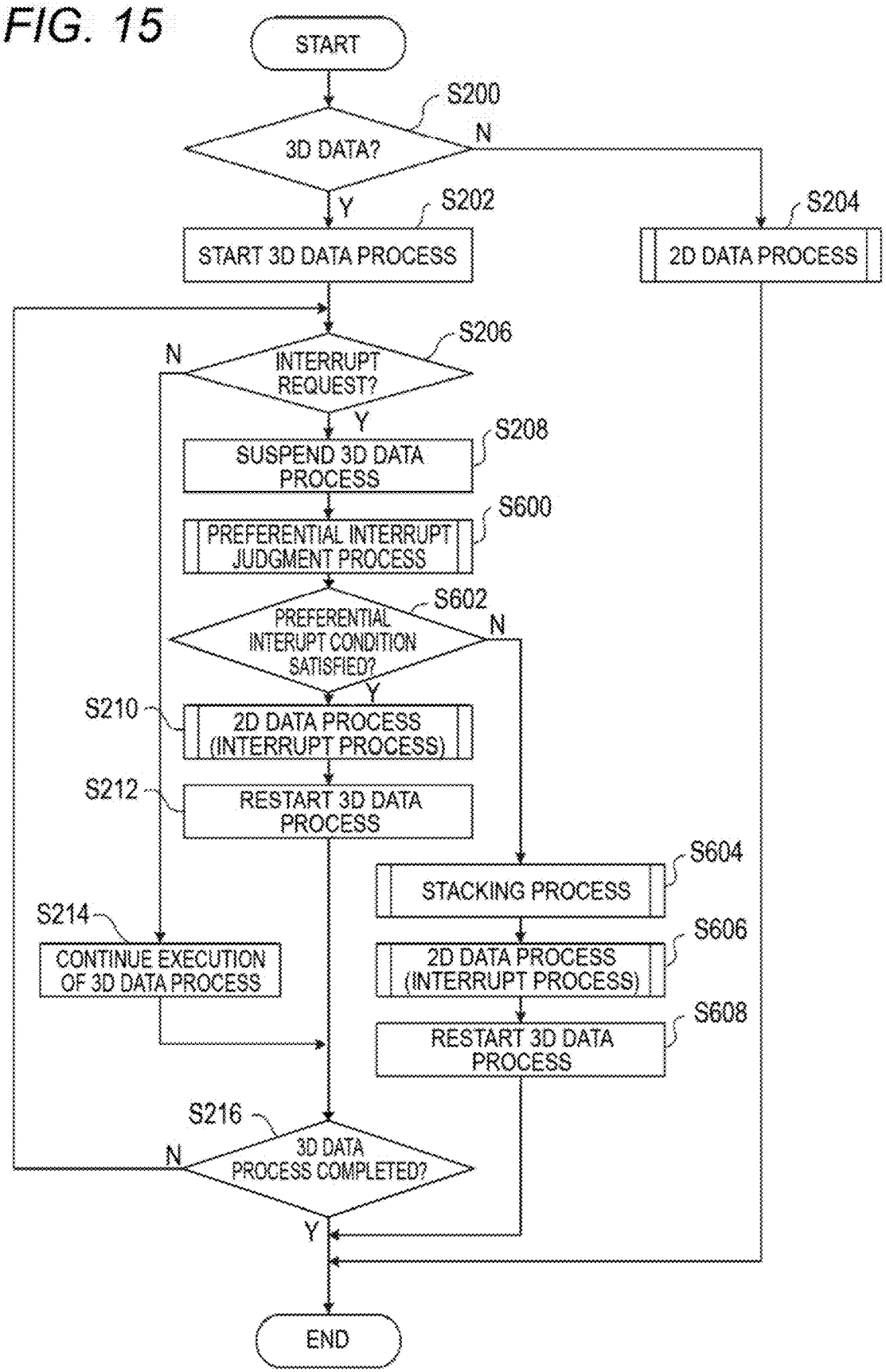
FIG. 15 is a flowchart showing an example processing procedure of an information processing program according to a third exemplary embodiment of the invention.

A third exemplary embodiment is the same as the first exemplary embodiment except that in the former an interrupt process is accepted with an exception that formation of remaining slice images of 3D modeling is performed first if a predetermined condition is satisfied, and hence only difference from the first exemplary embodiment will be described. FIG. 15 is a flowchart showing an example processing procedure of an information processing program according to the third exemplary embodiment of the invention. Steps of the information processing program according to the third exemplary embodiment having the same steps in the information processing program according to the first exemplary embodiment (see FIG. 10) will be given the same reference symbols as the latter and described in simplified manners.

As shown in FIG. 15, after starting a 3D data process at step 202, the CPU 30A judges at step S206 whether an interrupt request has been received during the execution of the 3D data process. If an interrupt request has been received, at step S208 the CPU 30A suspends the execution of the 3D data process. On the other hand, if judging at step S206 that no interrupt request has been received, the CPU 30A executes the process shown in step S214 to execute the 3D data process without interruption.

Figure 16:
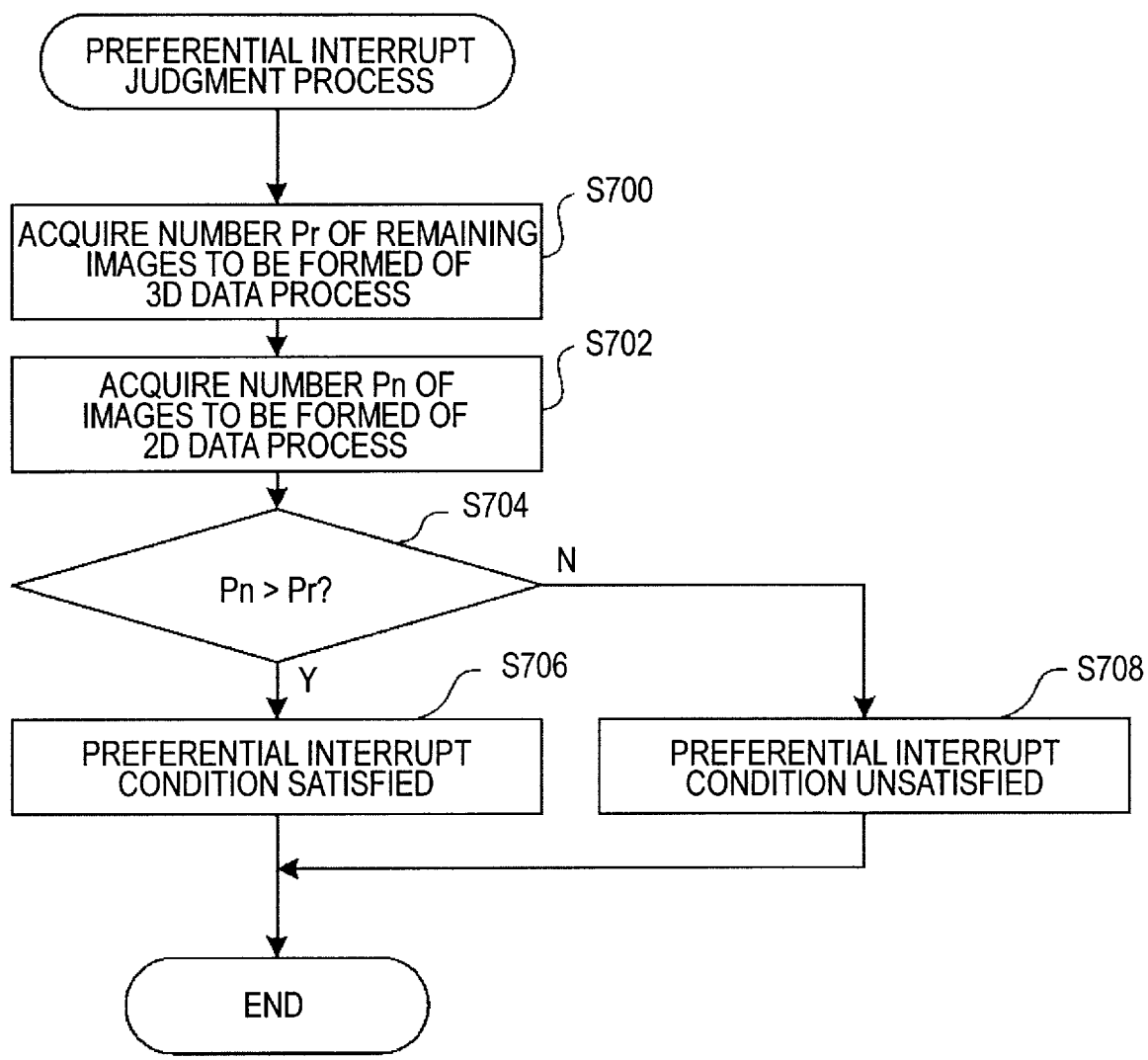
FIG. 16 is a flowchart showing a processing procedure of a preferential interrupt judgment process.

In the exemplary embodiment, the CPU 30A executes a preferential interrupt judgment process at step S600. The preferential interrupt judgment process will be described below. FIG. 16 is a flowchart showing a processing procedure of the preferential interrupt judgment process. As shown in FIG. 16, the CPU 30A acquires the number Pr of remaining images to be formed of the 3D data process at step S700 and acquires the number Pn of images to be formed of the 2D data process at step S702.

At step S704, the CPU 30A judges whether the number Pn is larger than the number Pr. If Pn>Pr, the CPU 30A judges at step S706 that the preferential interrupt condition is satisfied and finishes this routine. If Pn Pr, the CPU 30A judges at step S708 that the preferential interrupt condition is satisfied and finishes this routine.

Returning to the flowchart of FIG. 15, at step S602, the CPU 30A judges whether the preferential interrupt condition is satisfied on the basis of the result of the preferential interrupt judgment process. If the preferential interrupt condition is satisfied, the CPU 30A executes the process shown in step S210 (2D data process). At step S212, the CPU 30A restarts the 3D data process that has been suspended.

On the other hand, if the preferential interrupt condition is not satisfied, the CPU 30A executes the process shown in step S604 (stacking process). The CPU 30A executes a 2D data process at step S606 and restarts, at step S608, the 3D data process that has been suspended.

In the stacking process, the CPU 30A reads out all of remaining slice data, generates slice image data, converts the generated slice image data into raster image data, and outputs the raster image data to the image forming apparatus 12. The raster image data that are necessary for formation of remaining slice images for the 3D modeling are output to the image forming apparatus 12 together.

To allow the post-processing apparatus 14 to take out a bundle of recording media 50 in order from the top, the plural pieces of raster image data for formation of remaining slice images are output to the image forming apparatus 12 in such a manner that their order is reversed so that a recording medium 50 to be subjected to post-processing later is output earlier.

At step S216, the CPU 30A judges whether the 3D data process has been completed. If the 3D data process has not been completed yet, the CPU 30A executes the process shown in step S206 to judge again whether an interrupt request has been received during the execution of the 3D data process. On the other hand, this routine is finished if the 3D data process has been completed.

A description will be made of a main operation that the 3D modeling system performs following a judgment that the preferential interrupt condition is not satisfied. FIG. 17 is a sequence diagram illustrating an operation that the 3D modeling system performs after a judgment that the preferential interrupt condition is not satisfied is made in a preferential interrupt judgment process. As shown in FIG. 17, the information processing apparatus 10 executes the preferential interrupt judgment process after suspending a page-by-page process at step S324. If the preferential interrupt condition is not satisfied, the information processing apparatus 10 executes a stacking process which will be described below.

The information processing apparatus 10 reads out slice data of all of remaining pages at step S350, and generates slice image data of the remaining pages on the basis of the slice data of the remaining pages at step S352. At step S354, the information processing apparatus 10 generates raster image data of the remaining pages, and outputs the generated raster image data to the image forming apparatus 12.

The image forming apparatus 12 acquires the raster image data of the remaining pages at step S356, and forms slice images of the remaining pages on respective recording media 50 on the basis of the raster image data of the remaining pages at step S358. The recording media 50 on which the slice images of the remaining pages have been formed are stacked (i.e., stored together) in a storing mechanism which is disposed at a downstream end of the system. The bundle of recording media 50 stored in the storing mechanism is set in the post-processing apparatus 14 before a restart of the 3D data process.

Then, at step S360, the information processing apparatus 10 executes a 2D data process. Two-dimensional data are converted into raster image data, which are output to the image forming apparatus 12.

The image forming apparatus 12 acquires the raster image data for formation of 2D images at step S362, and forms 2D images on respective recording media 50 on the basis of the raster image data at step S364. Since the recording media 50 on which the 2D images have been formed need not be subjected to 3D modeling post-processing, they pass through the post-processing apparatus 14 and stored in the storing mechanism disposed at the downstream end of the system. The information processing apparatus 10 then restarts the page-by-page process that was suspended at step S324.

At step S366, the information processing apparatus 10 reads out slice data of one page from the slice data of the remaining pages, generates control data of one page from the slice data of one page, and outputs the control data of one page to the post-processing apparatus 14. The post-processing apparatus 14 acquires the control data of one page at step S368, and performs post-processing on a corresponding, slice-image-formed recording medium 50 according to the control data at step S370.

Steps S366-S370 are executed repeatedly for slice data of each page. In the exemplary embodiment, since the raster image data for slice images of the remaining pages have already been generated and output, only control data are generated and output after the restart of the page-by-page process.

In the exemplary embodiment, a 3D data process is interrupted in the midst of its execution and a 2D data process is started irrespective of whether the preferential interrupt condition is satisfied or not. Thus, the processing ability of the image forming apparatus 12 is not lowered.

In the exemplary embodiment, if the number Pn of images to be formed of a 2D data process is smaller than or equal to the number Pr of remaining images to be formed of a 3D data process, a stacking process is executed to generate and output raster image data for formation of slice images of remaining pages, whereby slice images of the remaining pages of 3D modeling are formed before execution of a 2D data process. Post-processing on slice-image-formed recording media 50 of the remaining pages of the 3D modeling is performed later separately from the formation of the slice images of the remaining pages of the 3D modeling.

Since the formation of the slice images of the remaining pages is separated from the post-processing on the slice-image-formed recording media 50 of the remaining pages by the stacking process, the processing abilities of the individual apparatus are made higher than in a case that they are not separated from each other. The image forming apparatus 12 can perform another image forming process without waiting for execution of post-processing on the slice-image-formed recording media 50 of the remaining pages. During that course, the image forming apparatus 12 can be used as an ordinary image forming apparatus for forming images on the basis of 2D image data rather than an apparatus dedicated to 3D modeling. Furthermore, since the slice images of the remaining pages have already been formed by the image forming apparatus 12, the post-processing apparatus 14 can start post-processing on the slice-image-formed recording media 50 of the remaining pages without any standby time.

The above-described information processing apparatus, 3D modeling system, and program according to the exemplary embodiments are just examples, and it goes without saying that they can be modified without departing from the spirit and scope of the invention.

For example, the interrupt judgment process of the second exemplary embodiment may be executed before the preferential interrupt judgment process of the third exemplary embodiment. In this case, a 2D data process is executed as an interrupt process only if a time Tn to be taken by the 2D data process is shorter than or equal to a remaining time Tr of a 3D data process. Even where the 2D data process is executed as an interrupt process, if the number Pn of images to be formed of the 2D data process is larger than the number Pr of remaining images to be formed of the 3D data process, a stacking process is executed to form slice images of the remaining pages before execution of the 2D data process.

What is claimed is:

1. An information processing apparatus comprising:
   an interrupting unit that, in case where image formation based on 2D image data is commanded during execution of 3D modeling based on slice data generated by slicing 3D data, suspends output of image formation data for formation of slice images on respective recording media by an image forming apparatus and output of control data that allow a post-processing apparatus to perform, without delay, post-processing of the 3D modeling on the recording media on which slice images have been formed by the image forming apparatus;
   a changing unit that changes order of execution of formation of remaining slice images of the 3D modeling, a remaining part of the post-processing of the 3D modeling, and image formation based on the 2D image data, according to a prescribed condition; and
   an output unit that generates image formation data from the 2D image data and outputs the generated image formation data to the image forming apparatus, generates image formation data from slice data and outputs the generated image formation data to the image forming apparatus, and generates control data based on the slice data and outputs the generated control data to the post-processing apparatus, according to the changed order,
   wherein the changing unit changes the order so that the formation of remaining slice images of the 3D modeling and the remaining part of the post-processing of the 3D modeling will be performed before the image formation based on the 2D image data in case where the time to be taken by the image formation based on the 2D image data is longer than the time to be taken by the formation of remaining slice images of the 3D modeling and the remaining part of the post-processing of the 3D modeling, and the changing unit changes the order so that remaining slice images of the 3D modeling will be formed together before the image formation based on the 2D image data and the remaining part of the post-processing of the 3D modeling will be performed after the image formation based on the 2D image data in case where the number of pages of the image formation based on the 2D image data is smaller than or equal to the number of remaining slice images of the 3D modeling.

2. The information processing apparatus according to claim 1, wherein the changing unit changes the order so that the image formation based on the 2D image data will be performed before the formation of remaining slice images of the 3D modeling and the remaining part of the post-processing of the 3D modeling in case where a time to be taken by the image formation based on the 2D image data is shorter than or equal to a time to be taken by the formation of remaining slice images of the 3D modeling and the remaining part of the post-processing of the 3D modeling.

3. The information processing apparatus according to claim 1, wherein the output unit outputs, to the image forming apparatus, plural pieces of image formation data to be used to form remaining slice images of the 3D modeling together after rearranging the plural pieces of image formation data in such order that a piece of image formation data to be subjected to post-processing of the 3D modeling later is output earlier.

4. A 3D modeling system comprising:
the information processing apparatus according to claim 1;
an image forming apparatus that forms slice images on respective recording media based on image formation data; and
a 3D modeling post-processing apparatus that performs 3D modeling post-processing on the recording media on which the slice images have been formed, according to control data corresponding to the respective slice images.

5. An information processing apparatus comprising:
an interrupting unit that, in case where image formation based on 2D image data is commanded during execution of 3D modeling based on slice data generated by slicing 3D data, suspends output of image formation data for formation of slice images on respective recording media by an image forming apparatus and output of control data that allow a post-processing apparatus to perform, without delay, post-processing of the 3D modeling on the recording media on which slice images have been formed by the image forming apparatus;
a changing unit that changes order of execution of formation of remaining slice images of the 3D modeling, a remaining part of the post-processing of the 3D modeling, and image formation based on the 2D image data, according to a prescribed condition; and
an output unit that generates image formation data from the 2D image data and outputs the generated image formation data to the image forming apparatus, generates image formation data from slice data and outputs the generated image formation data to the image forming apparatus, and generates control data based on the slice data and outputs the generated control data to the post-processing apparatus, according to the changed order,
wherein the changing unit changes the order so that the image formation based on the 2D image data will be performed before the formation of remaining slice images of the 3D modeling and the remaining part of the post-processing of the 3D modeling in case where the number of pages of the image formation based on the 2D image data is larger than the number of remaining slice images of the 3D modeling.

6. The information processing apparatus according to claim 5, wherein the changing unit changes the order so that remaining slice images of the 3D modeling will be formed together before the image formation based on the 2D image data and the remaining part of the post-processing of the 3D modeling will be performed after the image formation based on the 2D image data in case where the number of pages of the image formation based on the 2D image data is smaller than or equal to the number of remaining slice images of the 3D modeling.

7. The information processing apparatus according to claim 6, wherein the output unit outputs, to the image forming apparatus, plural pieces of image formation data to be used to form remaining slice images of the 3D modeling together after rearranging the plural pieces of image formation data in such order that a piece of image formation data to be subjected to post-processing of the 3D modeling later is output earlier.

8. A non-transitory computer readable medium storing a program for causing a computer to function as:
an interrupting unit that, in case where image formation based on 2D image data is commanded during execution of 3D modeling based on slice data generated by slicing 3D data, suspends output of image formation data for formation of slice images on respective recording media by an image forming apparatus and output of control data that allow a post-processing apparatus to perform, without delay, post-processing of the 3D modeling on the recording media on which slice images have been formed by the image forming apparatus;
a changing unit that changes order of execution of formation of remaining slice images of the 3D modeling, a remaining part of the post-processing of the 3D modeling, and image formation based on the 2D image data, according to a prescribed condition; and
an output unit that generates image formation data from the 2D image data and outputs the generated image formation data to the image forming apparatus, generates image formation data from slice data and outputs the generated image formation data to the image forming apparatus, and generates control data based on the slice data and outputs the generated control data to the post-processing apparatus, according to the changed order,
wherein the changing unit changes the order so that the formation of remaining slice images of the 3D modeling and the remaining part of the post-processing of the 3D modeling will be performed before the image formation based on the 2D image data in case where the time to be taken by the image formation based on the 2D image data is longer than the time to be taken by the formation of remaining slice images of the 3D modeling and the remaining part of the post-processing of the 3D modeling, and the changing unit changes the order so that remaining slice images of the 3D modeling will be formed together before the image formation based on the 2D image data and the remaining part of the post-processing of the 3D modeling will be performed after the image formation based on the 2D image data in case where the number of pages of the image formation based on the 2D image data is smaller than or equal to the number of remaining slice images of the 3D modeling.

* * * * *